US008752663B2

(12) United States Patent
Kimura

(10) Patent No.: US 8,752,663 B2
(45) Date of Patent: Jun. 17, 2014

(54) TRAVEL VEHICLE-MOUNTED ENGINE DEVICE

(75) Inventor: Tomoyuki Kimura, Osaka (JP)

(73) Assignee: Yanmar Co., Ltd., Osaka (JP)

(*) Notice: Subject to any disclaimer, the term of this patent is extended or adjusted under 35 U.S.C. 154(b) by 360 days.

(21) Appl. No.: 12/998,069

(22) PCT Filed: Sep. 17, 2009

(86) PCT No.: PCT/JP2009/066294
§ 371 (c)(1),
(2), (4) Date: Mar. 15, 2011

(87) PCT Pub. No.: WO2010/047199
PCT Pub. Date: Apr. 29, 2010

(65) Prior Publication Data
US 2011/0180344 A1 Jul. 28, 2011

(30) Foreign Application Priority Data
Oct. 20, 2008 (JP) ................................ 2008-269941

(51) Int. Cl.
*B60K 13/04* (2006.01)
*B60K 13/02* (2006.01)

(52) U.S. Cl.
USPC ........ 180/309; 180/68.3; 180/69.21; 180/900

(58) Field of Classification Search
USPC ........... 180/309, 68.3, 900, 69.2, 69.22, 69.3, 180/69.24, 69.23
See application file for complete search history.

(56) References Cited

U.S. PATENT DOCUMENTS

| | | | | |
|---|---|---|---|---|
| 5,575,513 | A * | 11/1996 | Tuttle | 292/339 |
| 6,068,675 | A * | 5/2000 | Tsuda et al. | 55/385.3 |
| 6,167,977 | B1 * | 1/2001 | Adamson et al. | 180/69.2 |
| 7,475,750 | B2 * | 1/2009 | Tokuhara | 180/69.2 |
| 8,042,638 | B2 * | 10/2011 | Tanaka | 180/89.12 |
| 8,230,761 | B2 * | 7/2012 | Takashina et al. | 74/664 |
| 8,371,408 | B2 * | 2/2013 | Kawashiri et al. | 180/69.21 |
| 2005/0045407 | A1 * | 3/2005 | Bulicz et al. | 180/309 |
| 2006/0289222 | A1 * | 12/2006 | Tokuhara | 180/305 |
| 2007/0056790 | A1 * | 3/2007 | Shigeta et al. | 180/225 |
| 2009/0260909 | A1 * | 10/2009 | Oka et al. | 180/291 |
| 2010/0086446 | A1 | 4/2010 | Matsunaga et al. | |
| 2011/0192671 | A1 * | 8/2011 | Mitsuda et al. | 180/309 |

FOREIGN PATENT DOCUMENTS

| | | |
|---|---|---|
| JP | 11-078987 | 3/1999 |
| JP | 2000-145430 | 5/2000 |
| JP | 2001-173429 | 6/2001 |
| JP | 2003-027922 | 1/2003 |

(Continued)

*Primary Examiner* — Katy M Ebner
*Assistant Examiner* — Emma K Frick
(74) *Attorney, Agent, or Firm* — Jordan and Hamburg LLP

(57) ABSTRACT

There is provided a travel vehicle-mounted engine device in which a particulate filter can be arranged in a highly rigid state in an engine as one of constituent parts of the engine to eliminate the need for taking countermeasures against exhaust gas for each unit of a vehicle or the like to thereby enhance the general purpose use of the engine. The travel vehicle mounted engine device mounted on a travel machine body and covered with a hood is provided with an air cleaner for supplying air to an engine and with a gas cleaning filter for cleaning exhaust gas from the engine. The air cleaner is arranged above an intake manifold on one side of an upper surface of the engine, and the gas cleaning filter is arranged above an exhaust manifold on the other side of the upper surface of the engine.

3 Claims, 19 Drawing Sheets

(56) References Cited

FOREIGN PATENT DOCUMENTS

| JP | 2003-041931 | 2/2003 |
| JP | 2004-066995 | 3/2004 |
| JP | 2004-100668 | 4/2004 |
| JP | 2007-182818 | 7/2007 |
| JP | 2008-031955 | 2/2008 |
| JP | 2008-082201 | 4/2008 |

* cited by examiner

TRAVEL VEHICLE-MOUNTED ENGINE DEVICE

BACKGROUND OF THE INVENTION

The present invention relates to a travel vehicle-mounted engine device provided with a gas cleaning filter for cleaning exhaust gas from a diesel engine or the like and, more particularly, to travel vehicle-mounted engine device provided with a gas cleaning filter for removing particulate matter (soot, particulate) or NOx (nitrogen oxide) contained in the exhaust gas.

There has been provided a technology in which a diesel particulate filter (or NOx catalyst) or the like is set in an exhaust gas emission path of a diesel engine mounted on a travel machine body or the like and, exhaust gas emitted from the diesel engine is cleaned by the diesel particulate filter (or NOx catalyst) or the like (see patent literature 1, patent literature 2, and patent literature 3). Further, there has been also known a technology in which a filter case (inner case) is fitted in a casing (outer case) and, a particulate filter is arranged in the filter case (see patent literature 4).

CITATION LIST

Patent document 1: Japanese Patent Application Laid-open No. 2000-145430
Patent document 2: Japanese Patent Application Laid-open No. 2003-27922
Patent document 3: Japanese Patent Application Laid-open No. 2008-82201
Patent document 4: Japanese Patent Application Laid-open No. 2001-173429

SUMMARY OF THE INVENTION

In a structure in which a particulate filter is arranged in an exhaust gas emission path of a diesel engine, in a case where the particulate filter is fitted separately from the diesel engine, the particulate filter needs to be set for each unit of a vehicle or the like mounted with the diesel engine. For example, in a case where a diesel engine and a particulate filter are fitted separately from each other in a unit of a vehicle or the like, there is presented a problem that different countermeasures need to be taken against the exhaust gas from the diesel engine for each unit of the vehicle or the like. Moreover, in a case where a particulate filter is mounted on a diesel engine in place of a silencer mounted on the diesel engine, since the particulate filter is heavier than the silencer, there is presented a problem that the particulate filter cannot be fitted only by utilizing the support structure of the silencer.

An object of the present invention is to provide a travel vehicle-mounted engine device in which a particulate filter can be arranged in a highly rigid state in an engine as one of constituent parts of the engine to eliminate the need for taking countermeasures against the exhaust gas for each unit of a vehicle or the like to thereby enhance the general purpose use of the engine.

To accomplish the object of the present invention, there is provided a travel vehicle-mounted engine device mounted on a travel machine body and covered with a hood, which includes an air cleaner for supplying air to an engine and a gas cleaning filter for cleaning exhaust gas from the engine, wherein the air cleaner is arranged above an intake manifold on one side of an upper surface of the engine, and the gas cleaning filter is arranged above an exhaust manifold on the other side of the upper surface of the engine.

The gas cleaning filter is arranged at an offset position closer to a center in a left and right width of the engine than the air cleaner. A clearance between an inner surface of the hood and the gas cleaning filter is made larger than a clearance between the air cleaner and the gas cleaning filter.

A clearance between an inner surface of the hood and the gas cleaning filter is made larger than a clearance between the inner surface of the hood and the air cleaner.

Disclosed is an exhaust connection pipe for making the gas cleaning filter communicate with the exhaust manifold and an exhaust throttle device for regulating an exhaust pressure of the engine, wherein the exhaust connection pipe is extended upward and an exhaust gas inlet of the gas cleaning filter is coupled to an upper end side of the exhaust connection pipe, the upper end side of the exhaust connection pipe is bent and extended closer to a center in the left and right width of the engine, and the exhaust throttle device is set in a connection portion in which the upper end side of the exhaust connection pipe is connected to the exhaust gas inlet of the gas cleaning filter.

There is provided a front filter bracket for supporting one end side of the gas cleaning filter by a front portion of a cylinder head of the engine and a rear filter bracket for supporting the other end side of the gas cleaning filter by a rear portion of the cylinder head of the engine, wherein the gas cleaning filter is supported within a front and rear width of the cylinder head.

There is provided a travel vehicle-mounted engine device mounted on a travel machine body and covered with a hood, which includes an air cleaner for supplying air to an engine and a gas cleaning filter for cleaning the exhaust gas from the engine, wherein the air cleaner is arranged above an intake manifold on one side of the upper surface of the engine, and the gas cleaning filter is arranged above an exhaust manifold on the other side of the upper surface of the engine. Thus, the air cleaner and the gas cleaning filter can be compactly set between the upper surface of the engine and the lower surface of the hood by the effective use of a space on the upper surface side of the engine. For example, when the shaft center line of the gas cleaning filter having an outer shape formed in a circular cylinder, the shaft center line of the air cleanser having an outer shape formed in a circular cylinder, and the shaft center line of a crank-shaped output shaft of the engine are arranged in parallel to each other when viewed from above, the gas cleaning filter and the air cleaner can be arranged within a square outer shape of the engine when viewed from above. That is, the outer shape (square outer shape) of the upper surface of the engine and the outer shape (square outer shape) of the upper surface of the gas cleaning filter and the air cleaner can be formed nearly in the same size, so that an engine room of a size required to have the engine fitted therein can be easily ensured. The gas cleaning filter and the air cleaner can be fitted close to each other at high positions in the hood without forming the hood in a large size.

The gas cleaning filter is arranged at an offset position closer to a center in the left and right width of the engine than the air cleaner, so that the gas cleaning filter having larger mass than the air cleaner can be supported at a position closer to the center in the left and right width of the engine. This can reduce mechanical vibrations and noises caused by the engine, and hence can simplify the structure of the vibration isolation rubber of the engine legs of the engine.

The clearance between the inner surface of the hood and the gas cleaning filter is made larger than the clearance between the air cleaner and the gas cleaning filter, so that the air cleaner can be easily heated by the heat of the gas cleaning filter arranged close to the air cleaner. Moreover, by the thermal insulation effect of the space between the gas cleaning filter and the inner surface of the hood, the temperature of the gas cleaning filter can be easily held at a temperature required for cleaning the exhaust gas and the hood can be prevented from being overheated by the exhaust heat at a comparatively high temperature of the gas cleaning filter.

The clearance between the inner surface of the hood and the gas cleaning filter is made larger than the clearance between the inner surface of the hood and the air cleaner, so that the gas cleaning filter having larger mass than the air cleaner can be supported closer to the center of the engine to reduce mechanical vibrations and noises caused by the engine. Hence, the structure of the vibration isolation rubber of the engine legs of the engine can be made simple.

The travel vehicle-mounted engine device includes an exhaust connection pipe for making the gas cleaning filter communicate with the exhaust manifold and an exhaust throttle device for regulating an exhaust pressure of the engine, wherein the exhaust connection pipe is extended upward and an exhaust gas inlet of the gas cleaning filter is coupled to an upper end side of the exhaust connection pipe, the upper end side of the exhaust connection pipe is bent and extended closer to a center in the left and right width of the engine, and the exhaust throttle device is set in a connection portion in which the upper end side of the exhaust connection pipe is connected to the exhaust gas inlet of the gas cleaning filter. Hence, the gas cleaning filter having larger mass than the air cleaner can be easily supported closer to the center of the engine without being restricted by the structure of the exhaust manifold. Hence, this can reduce mechanical vibrations and noises caused by the engine and can simplify the structure of the vibration isolation rubber of the engine legs of the engine. Moreover, the exhaust throttle device is set on the upper end side of the exhaust connection pipe bent closer to the center in the left and right width of the engine, so that the exhaust throttle device can be compactly supported within an installation space of the engine (external dimension of the engine=the left and right width dimension of the engine). The exhaust throttle device is not protruded outward from the one side surface of the engine. That is, the exhaust throttle device can be arranged inside the side surface of the engine having the exhaust throttle device arranged therein. Hence, this can prevent the exhaust throttle device from colliding with an obstacle and suffering damage in the operation of fitting or maintaining the engine.

The travel vehicle-mounted engine device includes a front filter bracket for supporting one end side of the gas cleaning filter by a front portion of a cylinder head of the engine and a rear filter bracket for supporting the other end side of the gas cleaning filter by a rear portion of the cylinder head of the engine, wherein the gas cleaning filter is supported within a front and rear width of the cylinder head. Hence, the gas cleaning filter having larger mass than the air cleaner can be easily supported within the front and rear width of the engine without being restricted by the structure of the exhaust manifold. An engine room of a size required to have the engine fitted therein can be easily ensured without forming the hood in a large size. The gas cleaning filter and the air cleaner can be compactly fitted at high positions in the hood.

DESCRIPTION OF THE PREFERRED EMBODIMENTS

Figure 1:
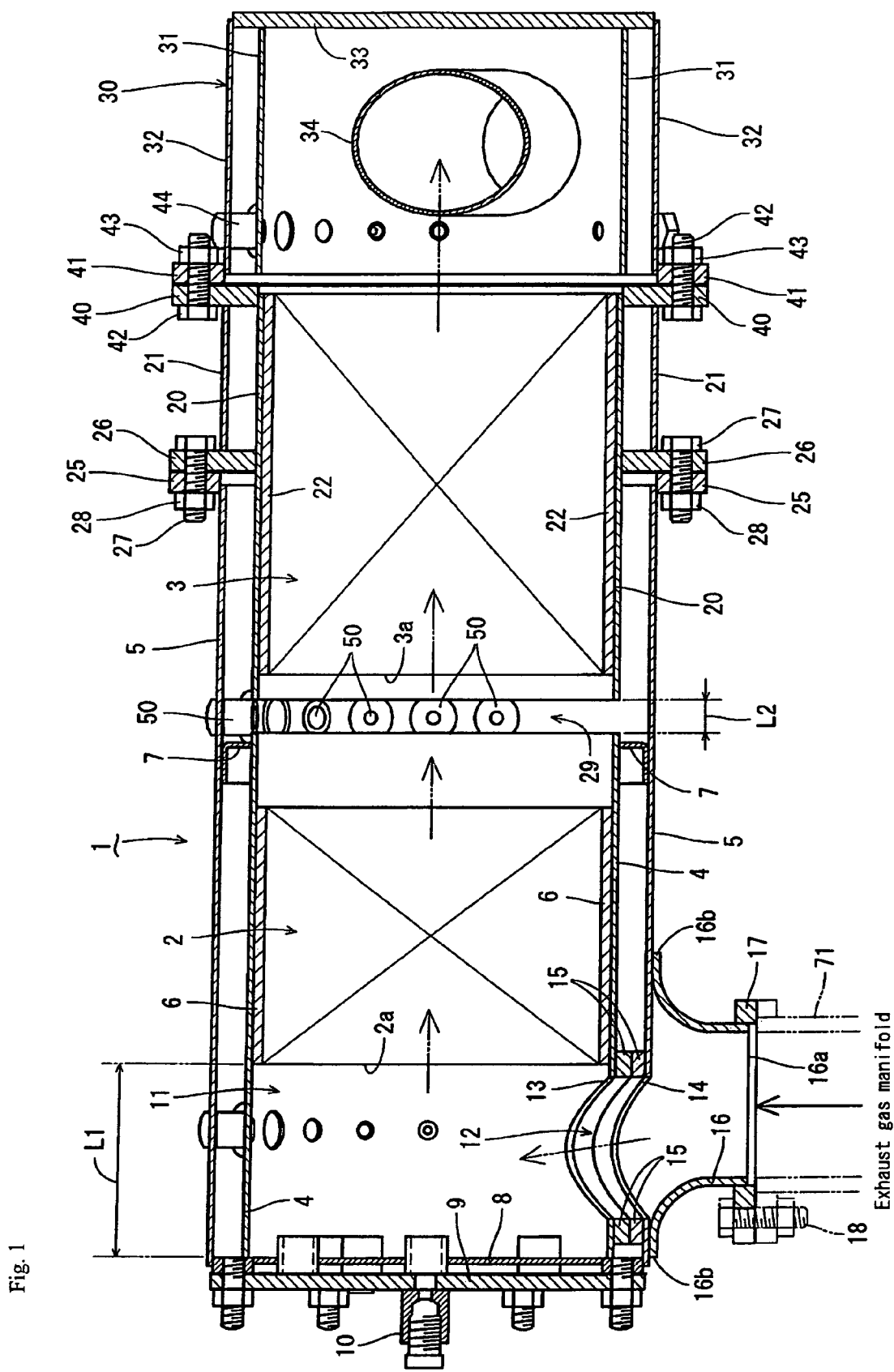
FIG. 1 is a cross-sectional view, when viewed from the front, of an exhaust gas cleaning system of an embodiment of the present invention.
Figure 2:
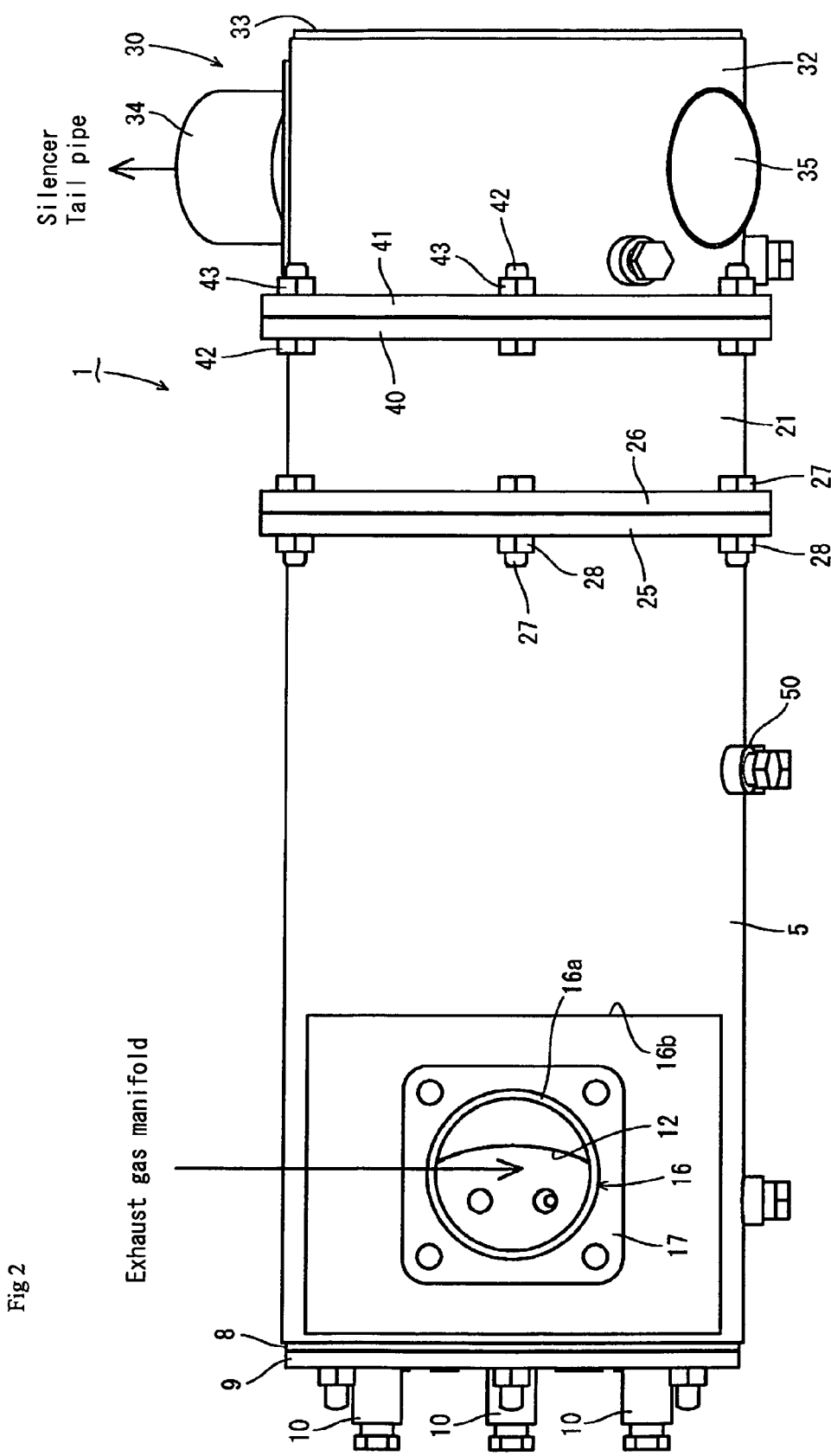
FIG. 2 is an external bottom view of the same.
Figure 3:
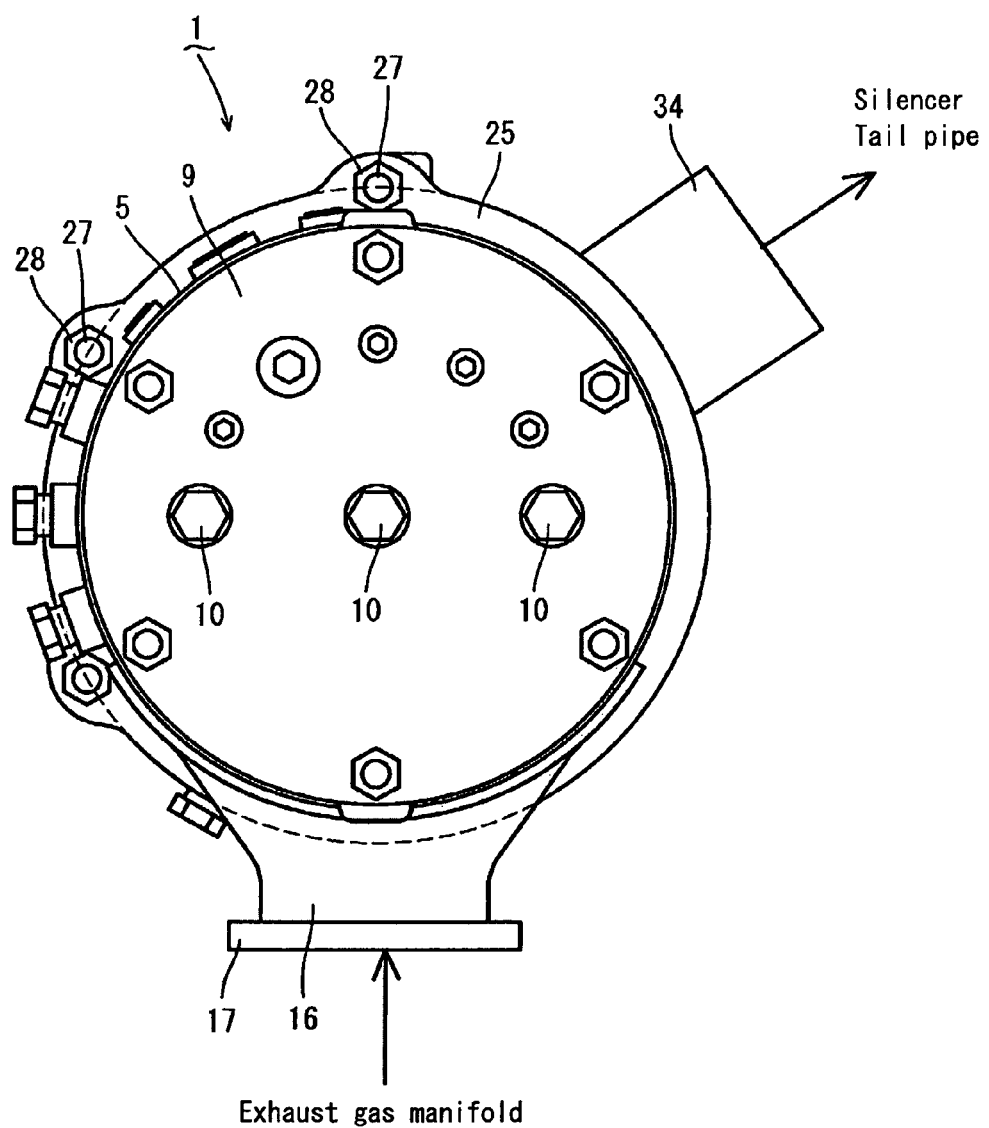
FIG. 3 is a left side view, when viewed from an exhaust gas inflow side, of the same.
Figure 4:
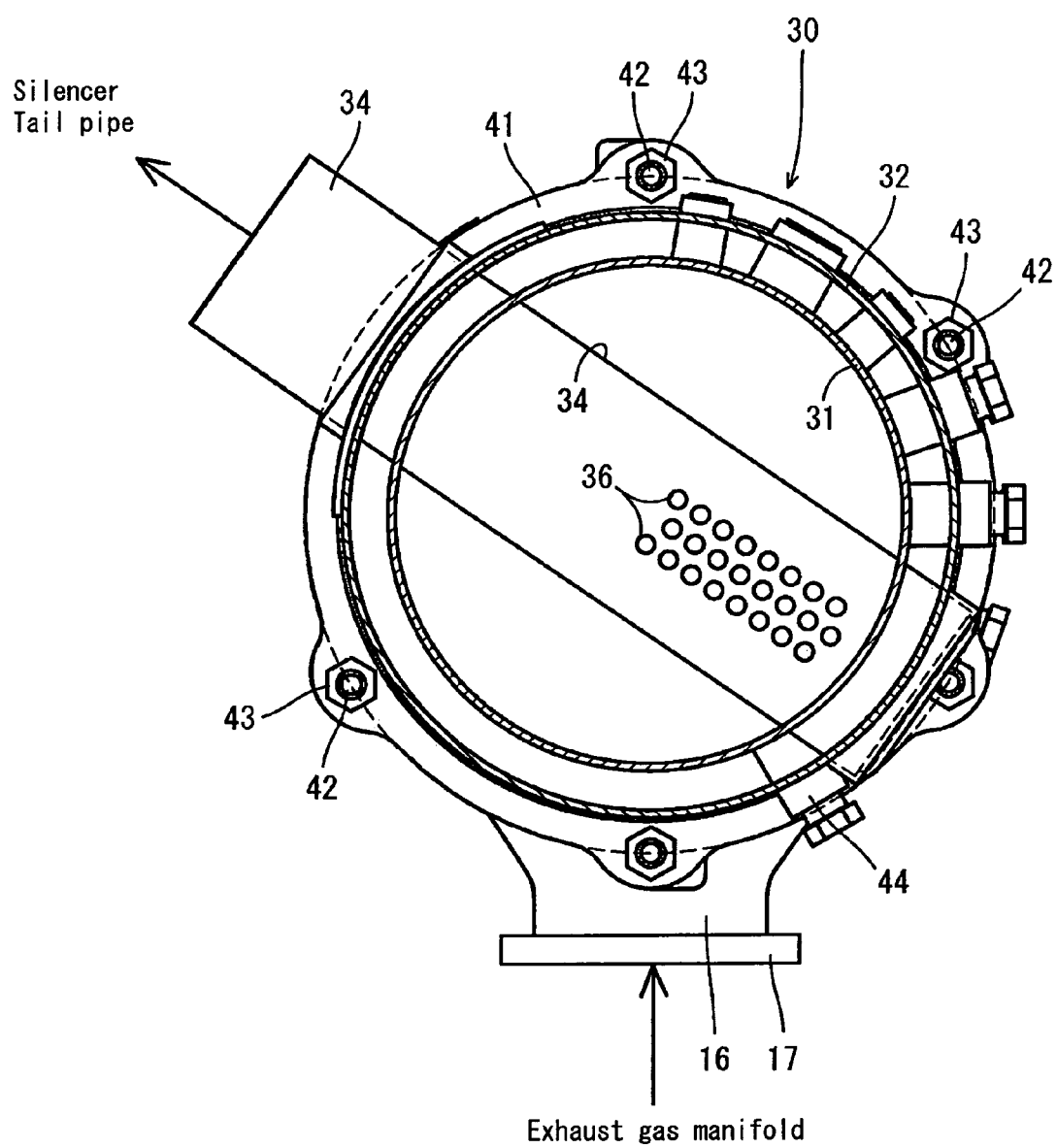
FIG. 4 is a right side cross-sectional view, when viewed from an exhaust gas outflow side, of the same.
Figure 5:
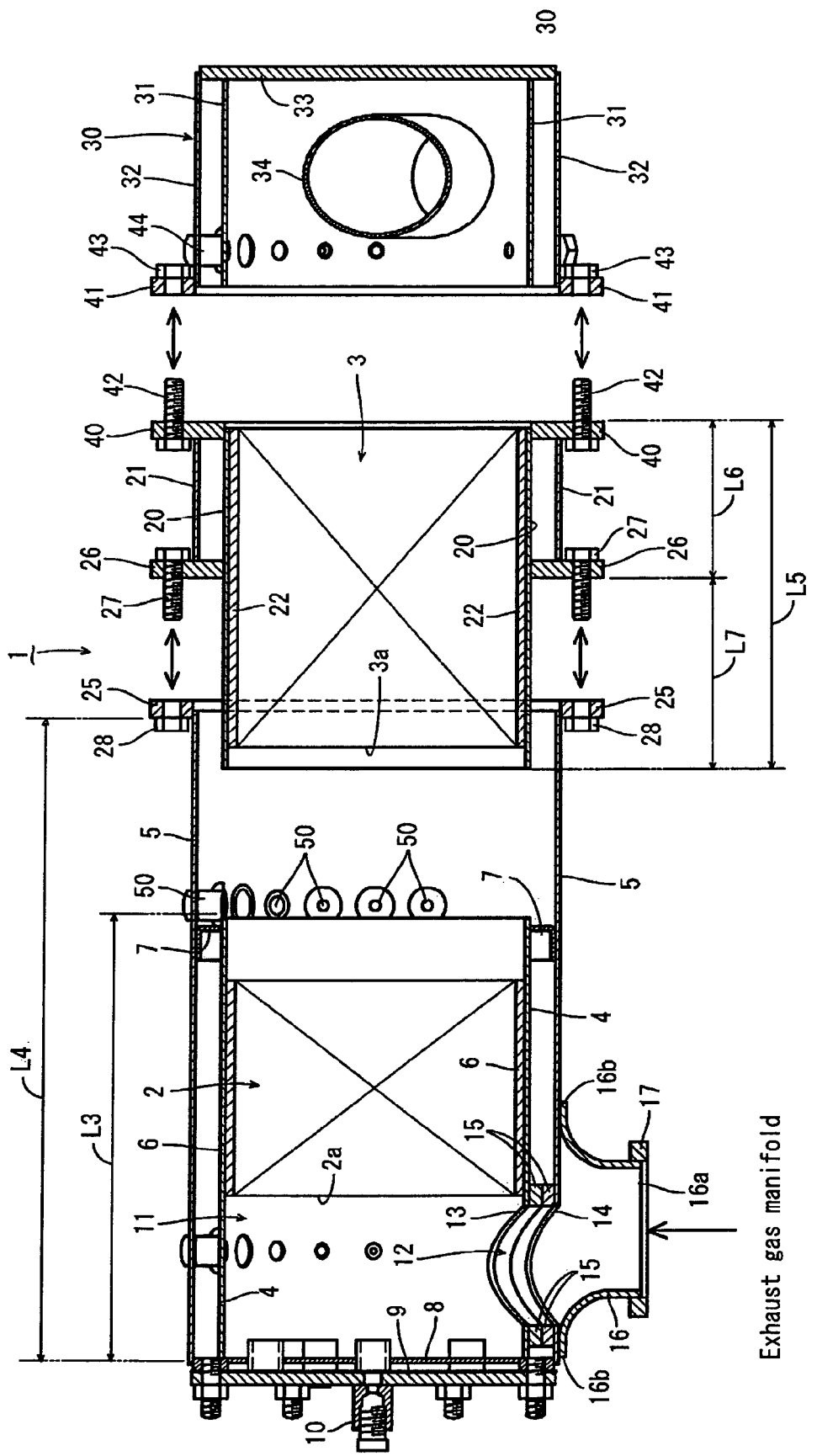
FIG. 5 is an exploded cross-sectional view, when viewed from the front, in FIG. 1.
Figure 6:
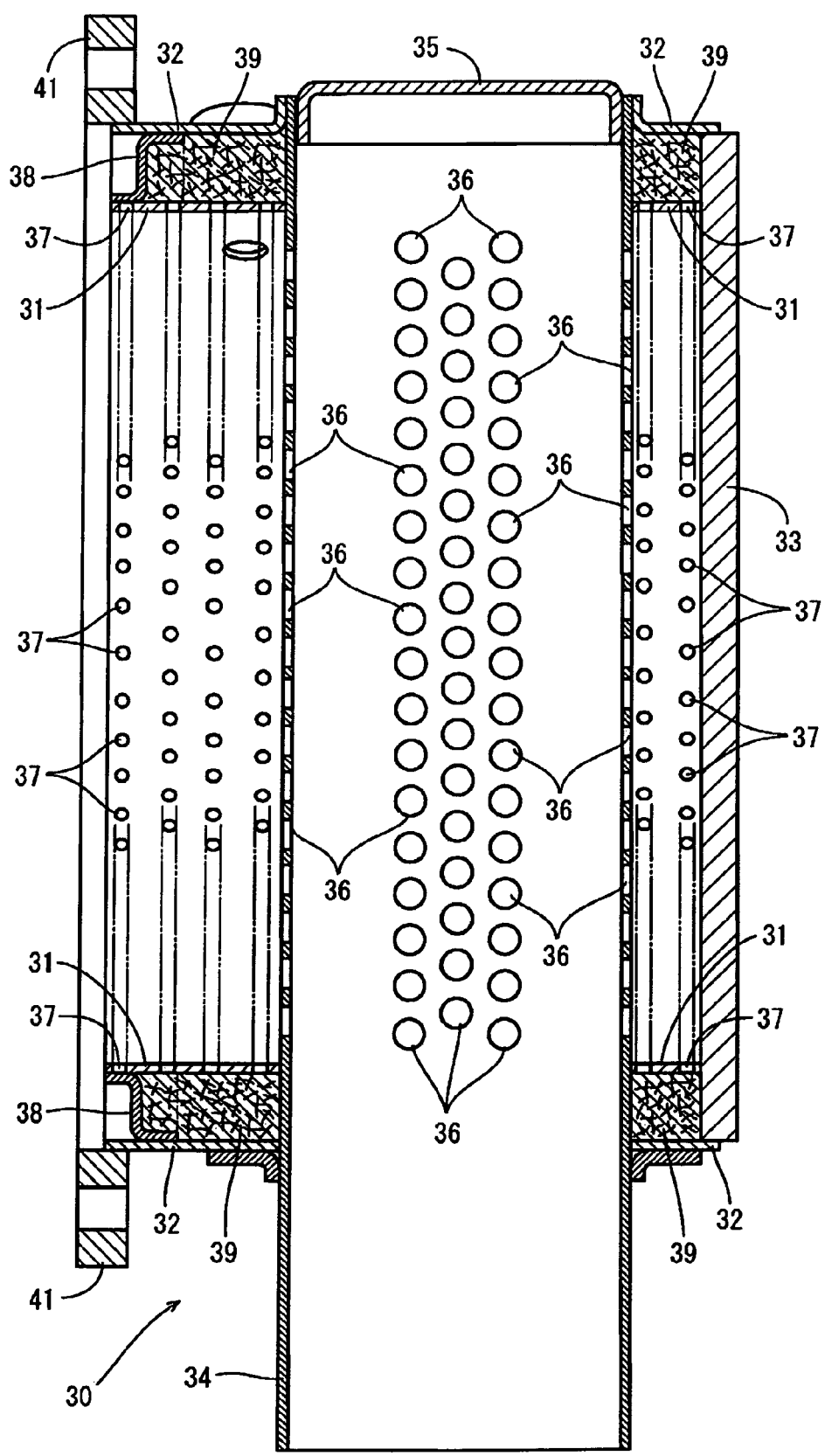
FIG. 6 is an enlarged cross-sectional view, when viewed from the front, of an exhaust gas outflow side of the same.
Figure 7:
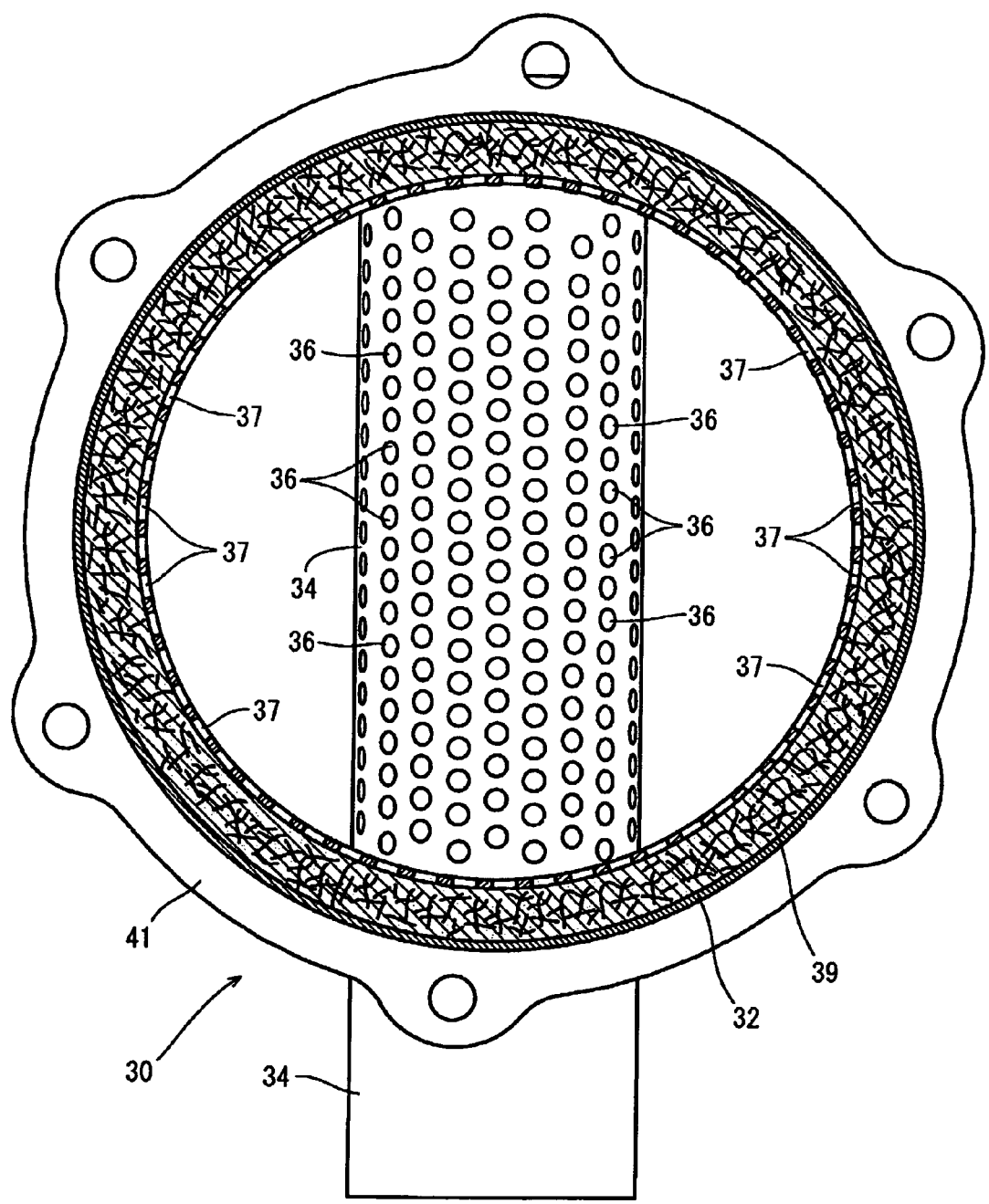
FIG. 7 is an enlarged cross-sectional view, when viewed from the side, of an exhaust gas outflow side of the same.
Figure 8:
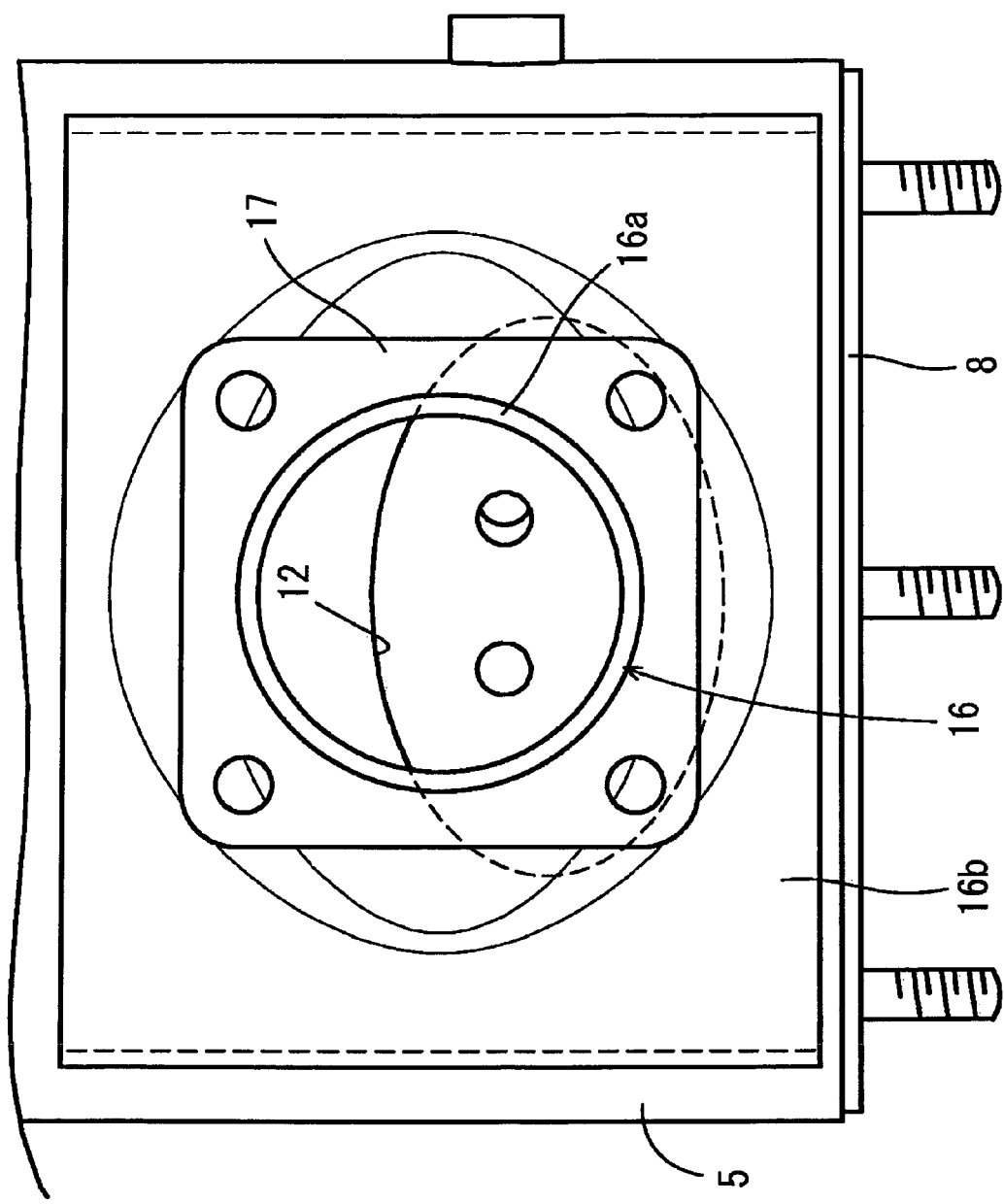
FIG. 8 is an enlarged bottom view of an exhaust gas inflow side of the same.
Figure 9:
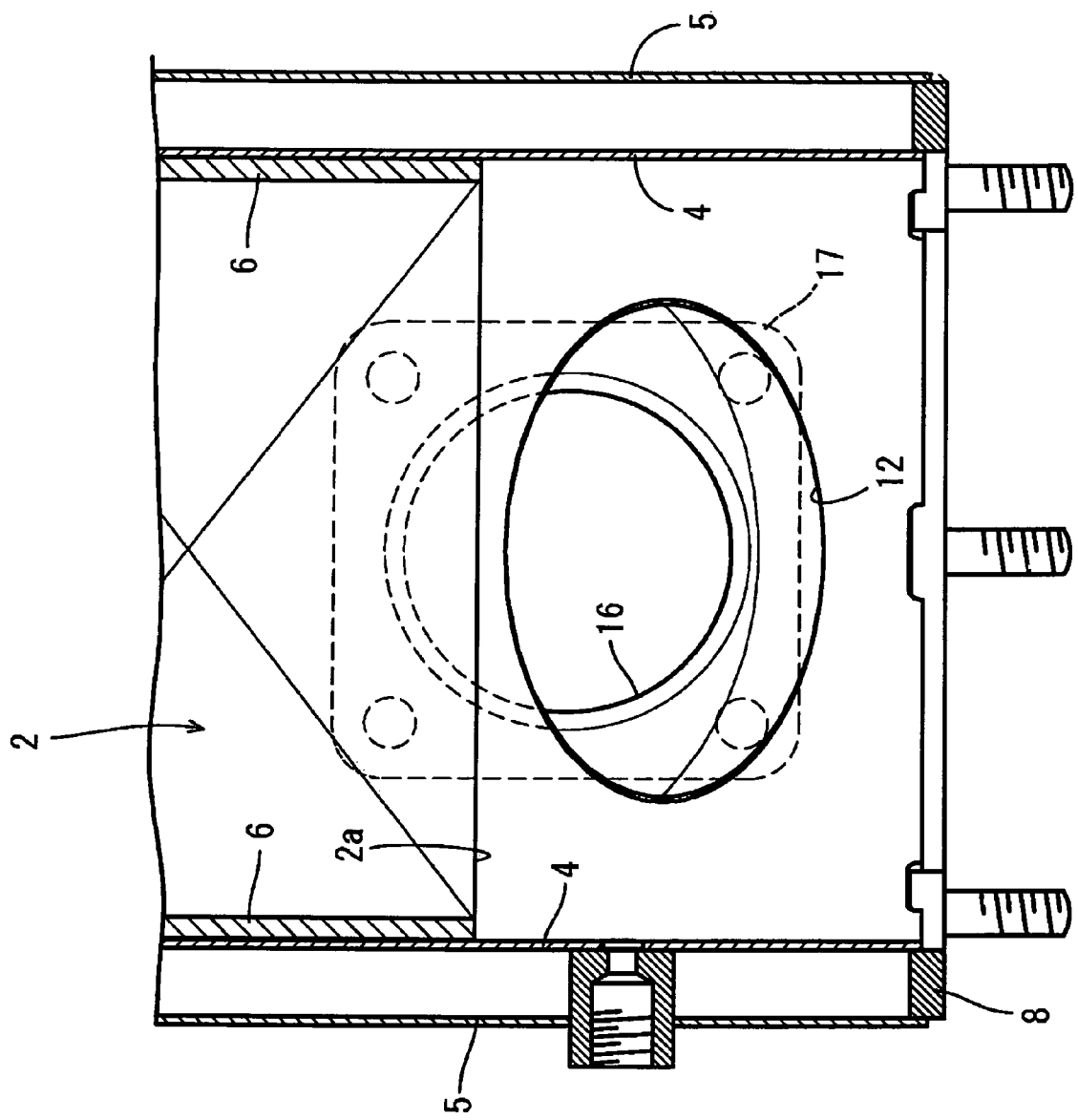
FIG. 9 is an enlarged cross-sectional view, when viewed in a plan view, of an exhaust gas inflow side of the same.

Hereinafter, an embodiment to embody the present invention will be described on the basis of the drawings. FIG. 1 is a cross-sectional view, when viewed from the front, of an exhaust gas cleaning system. FIG. 2 is an external bottom view of the same. FIG. 3 is a left side view, when viewed from an exhaust gas inflow side, of the same. FIG. 4 is a right side cross-sectional view, when viewed from an exhaust gas outflow side, of the same. FIG. 5 is an exploded cross-sectional view, when viewed from the front, in FIG. 1. FIG. 6 is an enlarged cross-sectional view, when viewed from the front, of an exhaust gas outflow side of the same. FIG. 7 is an enlarged cross-sectional view, when viewed from the side, of an exhaust gas outflow side of the same. FIG. 8 is an enlarged bottom view of an exhaust gas inflow side of the same. FIG. 9 is an enlarged cross-sectional view, when viewed in a plan view, of an exhaust gas inflow side of the same. The general structure of the exhaust gas cleaning system will be described with reference to FIG. 1 to FIG. 5. Here, in the following description, an exhaust gas inflow side is simply referred to as a left side and an exhaust gas outflow side is simply referred to as a right side.

As shown in FIG. 1 to FIG. 5, the present embodiment is provided with a continuous regeneration type diesel particulate filter (hereinafter referred to as "DPF") as an exhaust gas cleaning system. A DPF 1 is used to physically collect particulate matter (PM) or the like in exhaust gas. The DPF 1 has a structure in which a diesel oxidation catalyst 2 such as platinum for producing nitrogen dioxide ($NO_2$) and a honeycomb structured soot filter 3 for continuously oxidizing and removing the collected particulate matter (PM) at a comparatively low temperature are arranged in series in a direction in which the exhaust gas moves (in a direction from a left side to a right side in FIG. 1). The DPF 1 is constructed in such a way that the soot filter 3 is continuously regenerated. The DPF 1 not only can remove the particulate matter (PM) in the exhaust gas but also can reduce carbon monoxide (CO) and hydrocarbon (HC) in the exhaust gas.

A structure for fitting the diesel oxidation catalyst 2 will be described with reference to FIG. 1 and FIG. 5. As shown in FIG. 1 and FIG. 5, the diesel oxidation catalyst 2 as a gas cleaning filter for cleaning exhaust gas exhausted from an engine is fitted in a catalyst inner case 4 that is made of a heat resistant metal material nearly in the shape of a cylinder. The catalyst inner case 4 is fitted in a catalyst outer case 5 that is made of a heat resistant metal material nearly in the shape of a cylinder. That is, the catalyst inner case 4 is fitted onto the outside of the diesel oxidation catalyst 2 via a catalyst heat insulation material 6 made of ceramic fiber in the shape of a mat. The catalyst outer case 5 is fitted onto the outside of the catalyst inner case 4 via a support body 7 made of a thin plate and having an end face shaped like a letter I. Here, the diesel oxidation catalyst 2 is protected by the catalyst heat insulation material 6. The stress (deforming force) transmitted to the catalyst inner case 4 from the catalyst outer case 5 is reduced by the support body 7 made of the thin plate.

As shown in FIG. 1 and FIG. 5, a disk-shaped left cover 8 is firmly fixed to the left end portions of the catalyst inner case 4 and the catalyst outer case 5 by welding. A sensor connection plug 10 is firmly fixed to the left cover body 8 via a sitting plate 9. The left end surface 2*a* of the diesel oxidation catalyst 2 and the left cover body 8 are opposed to each other separately by a specified distance L1 for a gas inflow space. An exhaust gas inflow space 11 is formed between the left end surface 2*a* of the diesel oxidation catalyst 2 and the left cover body 8. In this regard, the sensor connection plug 10 has an inlet side exhaust gas pressure sensor and an inlet side exhaust gas temperature sensor, which are not shown in the drawing, connected thereto.

As shown in FIG. 1, FIG. 5, and FIG. 9, an ellipsoidal exhaust gas inflow port 12 is opened in the left end portions of the catalyst inner case 4, which has the exhaust gas inflow space 11 formed therein, and the catalyst outer case 5. The ellipsoidal exhaust gas inflow port 12 has a short diameter formed in a direction in which the exhaust gas moves (in the direction of a center line of the cases 4, 5) and has a long diameter formed in a direction perpendicular to the direction in which the exhaust gas moves (in the circumferential direction of the cases 4, 5). A closing ring 15 is clamped and fitted between an opening edge 13 of the catalyst inner case 4 and an opening edge 14 of the catalyst outer case 5. A clearance between the opening edge 13 of the catalyst inner case 4 and the opening edge 14 of the catalyst outer case 5 is closed by the closing ring 15. The closing ring 15 prevents the exhaust gas from flowing into a clearance between the catalyst inner case 4 and the catalyst outer case 5.

As shown in FIG. 1, FIG. 3, FIG. 5, and FIG. 8, an exhaust gas inlet pipe 16 is arranged on the outside surface of the catalyst outer case 5 having the exhaust gas inflow port 12 formed therein. An open end portion 16*a* formed in a true circular shape on the small diameter side of the exhaust gas inlet pipe 16 has an exhaust connection flange body 17 welded thereto. The exhaust connection flange body 17 is fastened to an exhaust manifold 71 of a diesel engine 70, which will be described later, with a bolt 18. An open end portion 16*b* formed in a true circular shape on the large diameter side of the exhaust gas inlet pipe 16 is welded to the outside surface of the catalyst outer case 5. The exhaust gas inlet pipe 16 is formed in a shape expanding toward the end (in the shape of a bugle) from the open end portion 16*a* formed in the true circular shape on the small diameter side to the open end portion 16*b* formed in the true circular shape on the large diameter side.

As shown in FIG. 1, FIG. 5, and FIG. 8, of the outside surface of the catalyst outer case 5, the outside surface of the left end portion of the opening edge 14 of the catalyst outer case 5 has the left end portion of the open end portion 16*b* welded thereto, the open end portion 16*b* being formed in the true circular shape on the large diameter side of the exhaust gas inlet pipe 16. That is, the exhaust gas inlet pipe 16 (open end portion 16*b* formed in the shape of the true circle on the large diameter side) is arranged offset on the downstream side in which the exhaust gas moves (on the right side of the catalyst outer case 5). That is, the ellipsoidal exhaust gas inflow port 12 is formed in the catalyst outer case 5 in such a way as to be arranged offset on the upstream side in which the exhaust gas moves (to the left side of the catalyst outer case 5) with respect to the exhaust gas inlet pipe 16 (open end portion 16*b* formed in the shape of the true circle on the large diameter side).

According to the above-mentioned construction, the exhaust gas from the engine 70 flows into the exhaust gas inlet pipe 16 from the exhaust manifold 71 and flows into the exhaust gas inflow space 11 through the exhaust gas inflow port 12 from the exhaust gas inlet pipe 16 and is supplied to the diesel oxidation catalyst 2 from the left end surface 2*a* of this diesel oxidation catalyst 2. Nitrogen dioxide ($NO_2$) is produced by the oxidation action of the diesel oxidation catalyst 2. Moreover, the DPF 1 is fixed to the diesel engine 70 via a support leg body 19, which will be described later.

A structure of fitting the soot filter 3 will be described with reference to FIG. 1 and FIG. 5. As shown in FIG. 1 and FIG. 5, the soot filter 3 acting as a gas cleaning filter for cleaning the exhaust gas exhausted from the engine 70 is fitted in a filter inner case 20 made of a heat resistant metal material nearly in the shape of a cylinder. The filter inner case 20 is fitted in a filter outer case 21 made of a heat resistant metal material nearly in the shape of a cylinder. That is, the filter inner case 20 is fitted onto the outside of the soot filter 3 via a filter heat insulation material 22 made of ceramic fiber in the shape of a mat. In this regard, the soot filter 3 is protected by the filter heat insulation material 22.

As shown in FIG. 1 and FIG. 5, a catalyst-side flange 25 is welded to an end portion on the downstream side (right side), in which the exhaust gas moves, of the catalyst outer case 5. A filter-side flange 26 is welded to a middle portion in the direction in which the exhaust gas moves of the filter inner case 20 and to an end portion on the upstream side (left side), in which the exhaust gas moves, of the filter outer case 21. The catalyst-side flange 25 is detachably fastened to the filter-side flange 26 by bolts 27 and nuts 28. In this regard, the diameter of the cylindrical catalyst inner case 4 is nearly equal to the diameter of the cylindrical filter inner case 20. Further, the diameter of the cylindrical catalyst outer case 5 is nearly equal to the diameter of the cylindrical filter outer case 21.

As shown in FIG. 1, in the state in which the filter outer case 21 is coupled to the catalyst outer case 5 via the catalyst-side flange 25 and the filter-side flange 26, the end portion on the upstream side (left side), in which the exhaust gas moves, of the filter inner case 20 is opposed to the end portion on the downstream side (right side), in which the exhaust gas moves, of the catalyst inner case 4 in such a way as to be separated from each other by a specified gap L2 in which a sensor is to be fitted. That is, a sensor fitting space 29 is formed between the end portion on the downstream side (right side), in which the exhaust gas moves, of the catalyst inner case 4 and the end portion on the upstream side (left side), in which the exhaust gas moves, of the filter inner case 20. Sensor connection plugs 50 are fixed to the catalyst outer case 5 in the sensor fitting space 29. The sensor connection plugs 50 have a filter inlet-side exhaust gas pressure sensor and a filter inlet-side exhaust gas temperature sensor (thermistor) connected thereto.

As shown in FIG. 5, a cylinder length L4 in the direction in which the exhaust gas moves of the catalyst outer case 5 is made longer than a cylinder length L3 in the direction in which the exhaust gas moves of the catalyst inner case 4. A cylinder length L6 in the direction in which the exhaust gas moves of the filter outer case 21 is made shorter than a cylinder length L5 in the direction in which the exhaust gas moves of the filter inner case 20. The total sum (L2+L3+L5) of the specified gap L2 of the sensor fitting space 29, the cylinder length L3 of the catalyst inner case 4, and the cylinder length L5 of the filter inner case 20 is made nearly equal to the total sum (L4+L6) of the cylinder length L4 of the catalyst outer case 5 and the cylinder length L6 of the filter outer case 21. The end portion on the upstream side (left side), in which the exhaust gas moves, of the filter inner case 20 is protruded from the end portion on the upstream side (left side), in which the exhaust gas moves, of the filter outer case 21 by a difference between these lengths (L7=L5−L6). That is, when the filter outer case 21 is coupled to the catalyst outer case 5, the end portion on the upstream side (left side), in which the exhaust gas moves, of the filter inner case 20 is inserted into the downstream side (right side), in which the exhaust gas moves, of the catalyst outer case 5 by an overlap length L7.

According to the above-mentioned construction, the nitrogen dioxide ($NO_2$) produced by the oxidation action of the diesel oxidation catalyst 2 is supplied to the soot filter 3 from the left end surface 3a of the soot filter 3. The collected particulate matter (PM) in the exhaust gas from the diesel engine 70 collected by the soot filter 3 is continuously removed by nitrogen dioxide ($NO_2$) at a comparatively low temperature. Not only the particulate matter ($P^M$) in the exhaust gas from the diesel engine 70 collected by the soot filter 3 is removed, but also carbon monoxide (CO) and hydrocarbon (HC) in the exhaust gas from the engine 70 is reduced.

In this regard, as described, the diesel oxidation catalyst 2 and the soot filter 3 are provided as the gas cleaning filter for cleaning the exhaust gas exhausted from the engine. However, in place of the diesel oxidation catalyst 2 and the soot filter 3, there may be provided a $NO_x$ selectively reducing catalyst (NOx removing catalyst) for reducing nitrogen oxide (NOx) in the exhaust gas from the engine 70 by ammonia ($NH_3$) produced by adding urea (reducing agent) and an ammonia removing catalyst for removing remaining ammonia discharged from the NOx selectively reducing catalyst.

As described above, when the catalyst inner case 4 is provided with the $NO_x$ selectively reducing catalyst (NOx removing catalyst) as the gas cleaning filter and the filter inner case 20 is provided with the ammonia removing catalyst, the nitrogen oxide (NOx) in the exhaust gas exhausted from the engine is reduced and can be discharged as harmless nitrogen gas ($N_2$).

A structure for fitting a silencer 30 will be described with reference to FIG. 1 to FIG. 3 and FIG. 5 to FIG. 7. A shown in FIG. 1 to FIG. 3 and FIG. 5, the silencer 30 for damping the sound of the exhaust gas exhausted from the engine has a silencer inner case 31 made of a heat resistant metal material nearly in the shape of a cylinder, a silencer outer case 32 made of a heat resistant metal material nearly in the shape of a cylinder, and a circular disk-shaped right cover body 33 welded to the right end portions of the silencer inner case 31 and the silencer outer case 32. The silencer inner case 31 is fitted in the silencer outer case 32. Further, the diameter of the cylindrical catalyst outer case 5, the diameter of the cylindrical filter outer case 21, and the diameter of the cylindrical silencer outer case 32 are made nearly equal to each other. The diameter of the cylindrical catalyst inner case 4, the diameter of the cylindrical filter inner case 20, and the diameter of the cylindrical silencer inner case 31 are made nearly equal to each other. Here, the diameter of the cylindrical catalyst inner case 4, the diameter of the cylindrical filter inner case 20, and the diameter of the cylindrical silencer inner case 31 do not need to be made equal to each other.

As shown in FIG. 4 to FIG. 7, the exhaust gas outlet pipe 34 is passed through the silencer inner case 31 and the silencer outer case 32. One end side of the exhaust gas outlet pipe is closed by an outlet cover body 35. Many exhaust holes 36 are made in the whole portion of the exhaust gas outlet pipe 34 in the silencer inner case 31. The interior of the silencer inner case 31 is made to communicate with the exhaust gas outlet pipe 34 via many exhaust holes 36. A silencer and a tail pipe, which are not shown in the drawing, are connected to the other end side of the exhaust gas outlet pipe 34.

As shown in FIG. 6, 7, the silencer inner case 31 has many silencer holes 37 made therein. The interior of the silencer inner case 31 is made to communicate with a space between the silencer inner case 31 and the silencer outer case 32 via many silencer holes 37. The space between the silencer inner case 31 and the silencer outer case 32 is closed by the right cover body 33 and a support body 38 made of a thin plate. The space between the silencer inner case 31 and the silencer outer case 32 is filled with a silencer material 39 made of ceramic fiber. The end portion on the upstream side (left side), in which the exhaust gas moves, of the silencer inner case 31 is coupled to the end portion on the upstream side (left side), in which the exhaust gas moves, of the silencer outer case 32.

According to the above-mentioned construction, the exhaust gas is exhausted through the exhaust gas outlet pipe 34 from inside the silencer inner case 31. In the silencer inner case 31, the sound of the exhaust gas (sound of a high-frequency band) is absorbed by the silencer material 39 through many silencer holes 37. The noises of the exhaust gas exhausted from the outlet side of the exhaust gas outlet pipe 34 are damped.

As shown in FIG. 1 and FIG. 5, a filter-side outlet flange 40 is welded to the end portions on the downstream side (right side), in which the exhaust gas moves, of the filter inner case 20 and the filter outer case 21. A silencer-side flange 41 is welded to the end portion on the upstream side (left side), in which the exhaust gas moves, of the silencer outer case 32. The filter-side outlet flange 40 is detachably fastened to the silencer-side flange 41 by bolts 42 and nuts 43. Here, a sensor connection plug 44 is fixed to the filter inner case 20 and the filter outer case 21. The sensor connection plug 44 has an outlet-side exhaust gas pressure sensor and an outlet-side exhaust gas temperature sensor (thermistor) and the like connected thereto, the outlet-side exhaust gas pressure sensor and the outlet-side exhaust gas temperature sensor being not shown in the drawing.

A structure in which the diesel engine 70 is provided with the DPF 1 will be described with reference to FIG. 10 to FIG. 15. As shown in FIG. 10 to FIG. 15, the exhaust manifold 71 is arranged on the left surface of a cylinder head 72 of the diesel engine 70. An intake manifold 73 is arranged on the right surface of the cylinder head 72 of the diesel engine 70. The cylinder head 72 is mounted on a cylinder block 75 having an engine output shaft 74 (crankshaft) and a piston (not shown in the drawing). The front end and the rear end of the engine output shaft 74 are protruded from the front surface and the rear surface of the cylinder block 75. A cooling fan 76 is provided on the front side of the cylinder block 75. A rotational force is transmitted to the cooling fan 76 via a V-belt 77 from the front end side of the engine output shaft 74.

Figure 10:
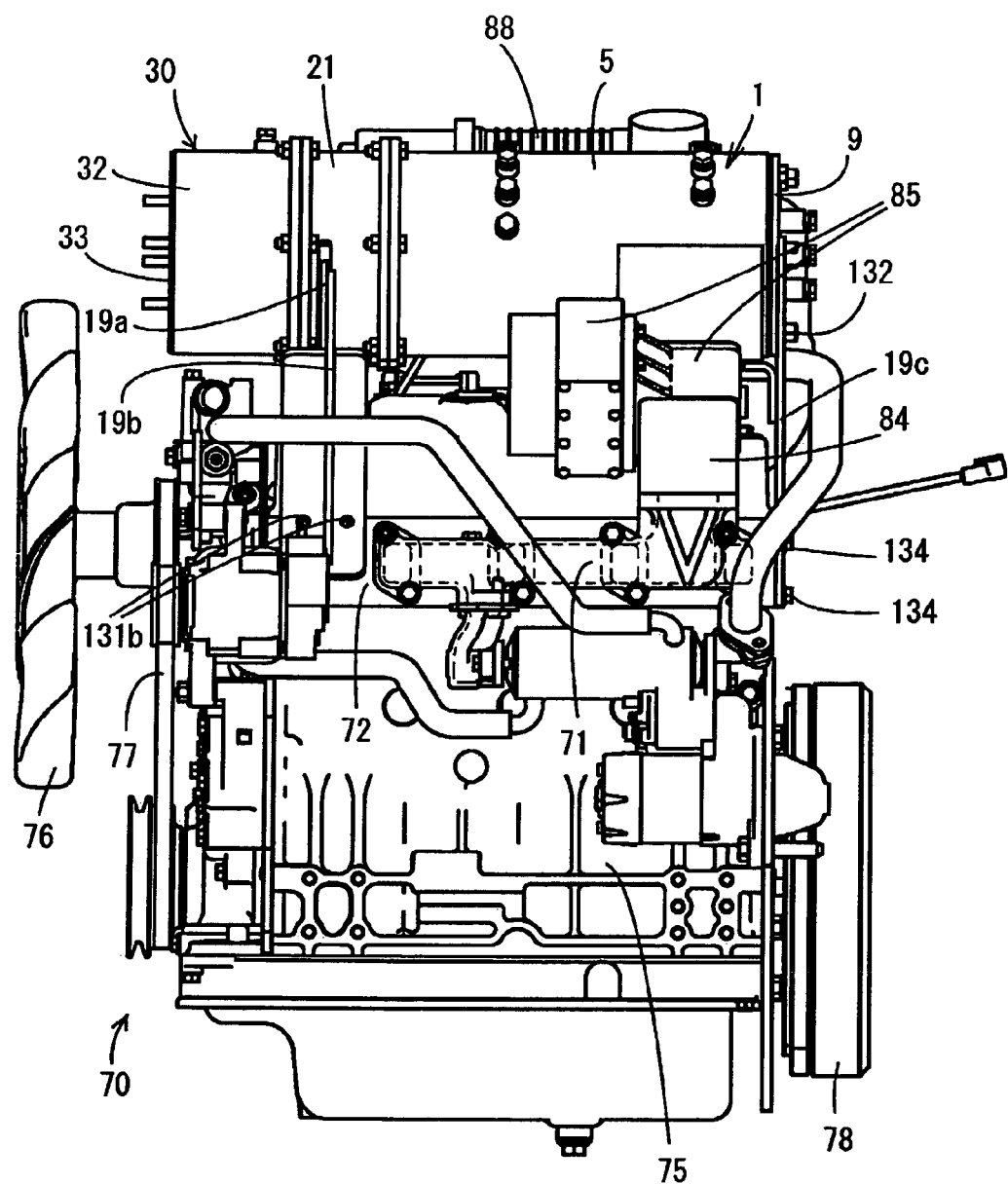
FIG. 10 is a left side view of a diesel engine.
Figure 11:
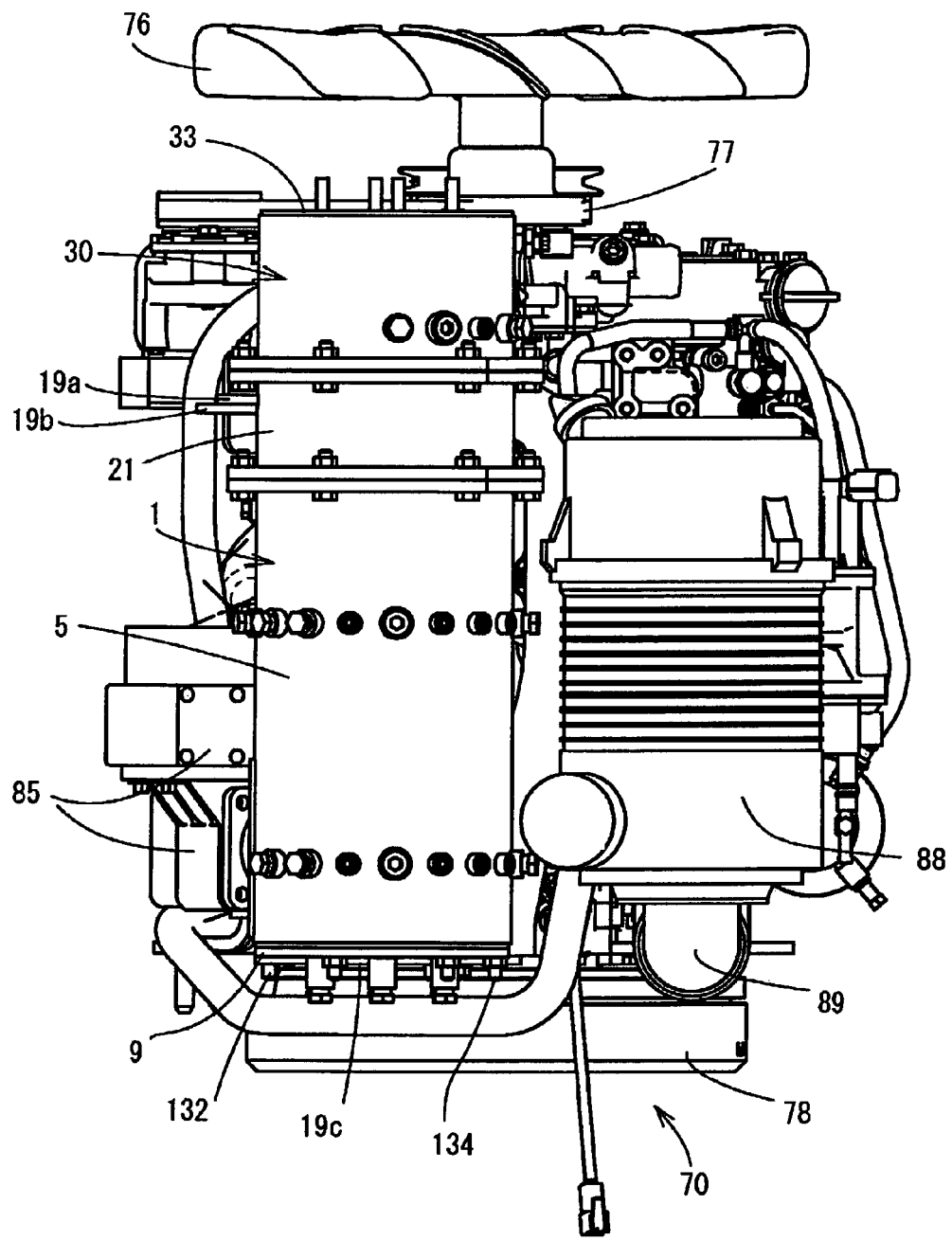
FIG. 11 is a plan view of the diesel engine.
Figure 12:
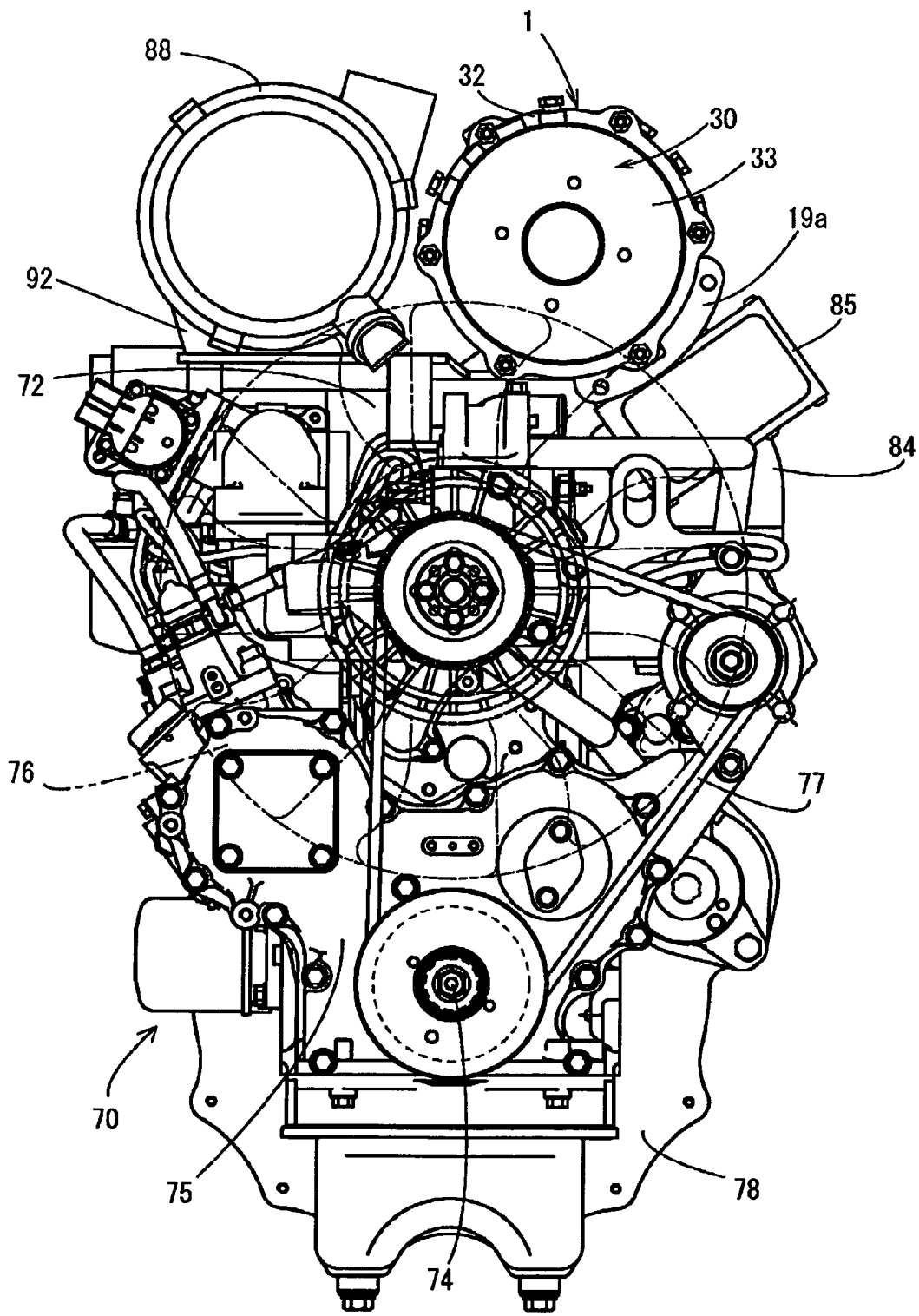
FIG. 12 is a front view of the diesel engine.
Figure 13:
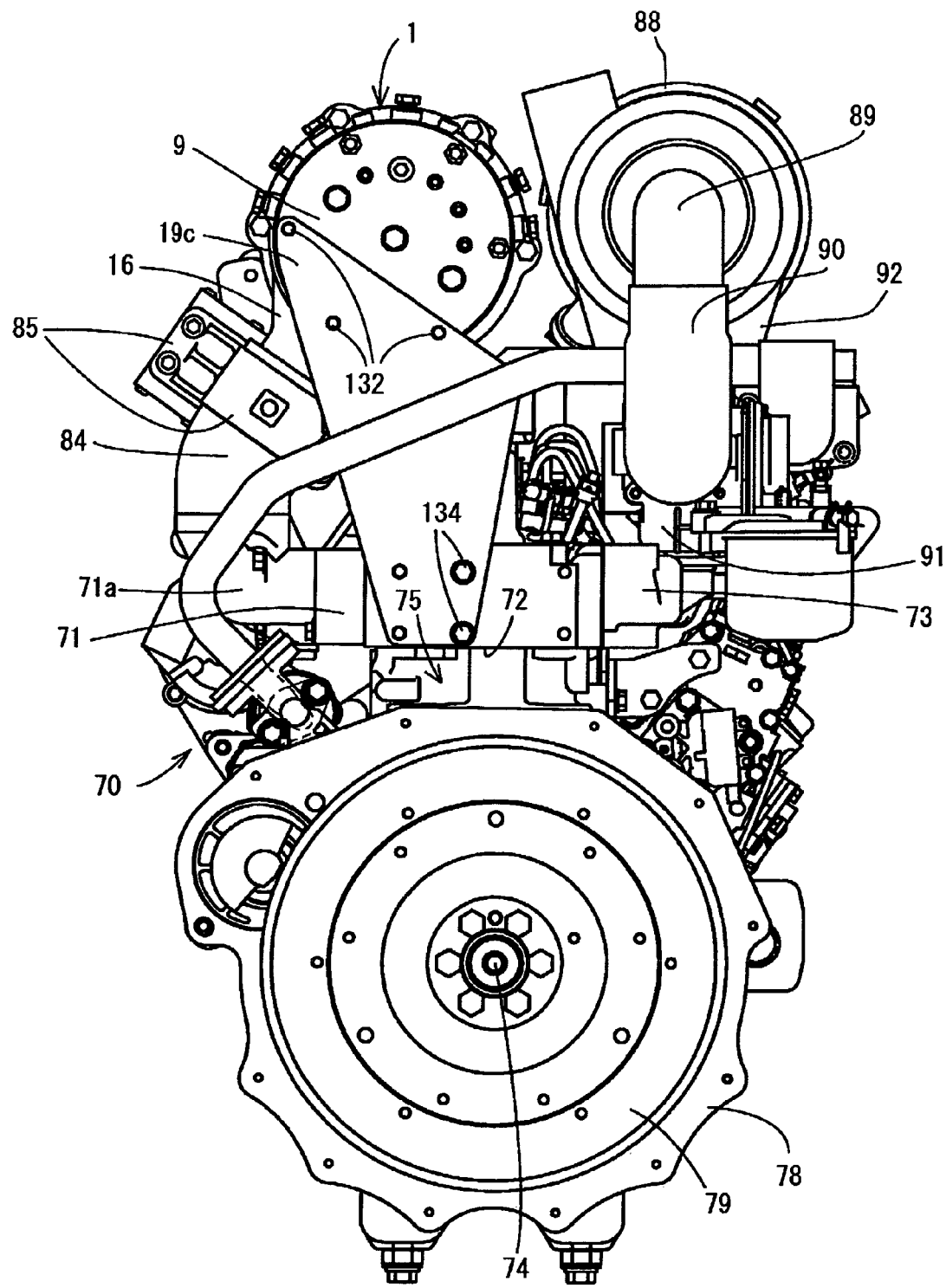
FIG. 13 is a rear view of the diesel engine.

As shown in FIG. 10. FIG. 11, and FIG. 13, a flywheel housing 78 is fixed to the rear surface of the cylinder block 75. A flywheel 79 is fitted in the flywheel housing 78. The flywheel 79 is pivotally supported by the rear end side of the engine output shaft 74. The power of the diesel engine 70 is taken out to the operating parts (wheels, PTO shaft for operation) of a tractor 100 for an agricultural work via the flywheel 79, the tractor 100 being described later.

Figure 15:
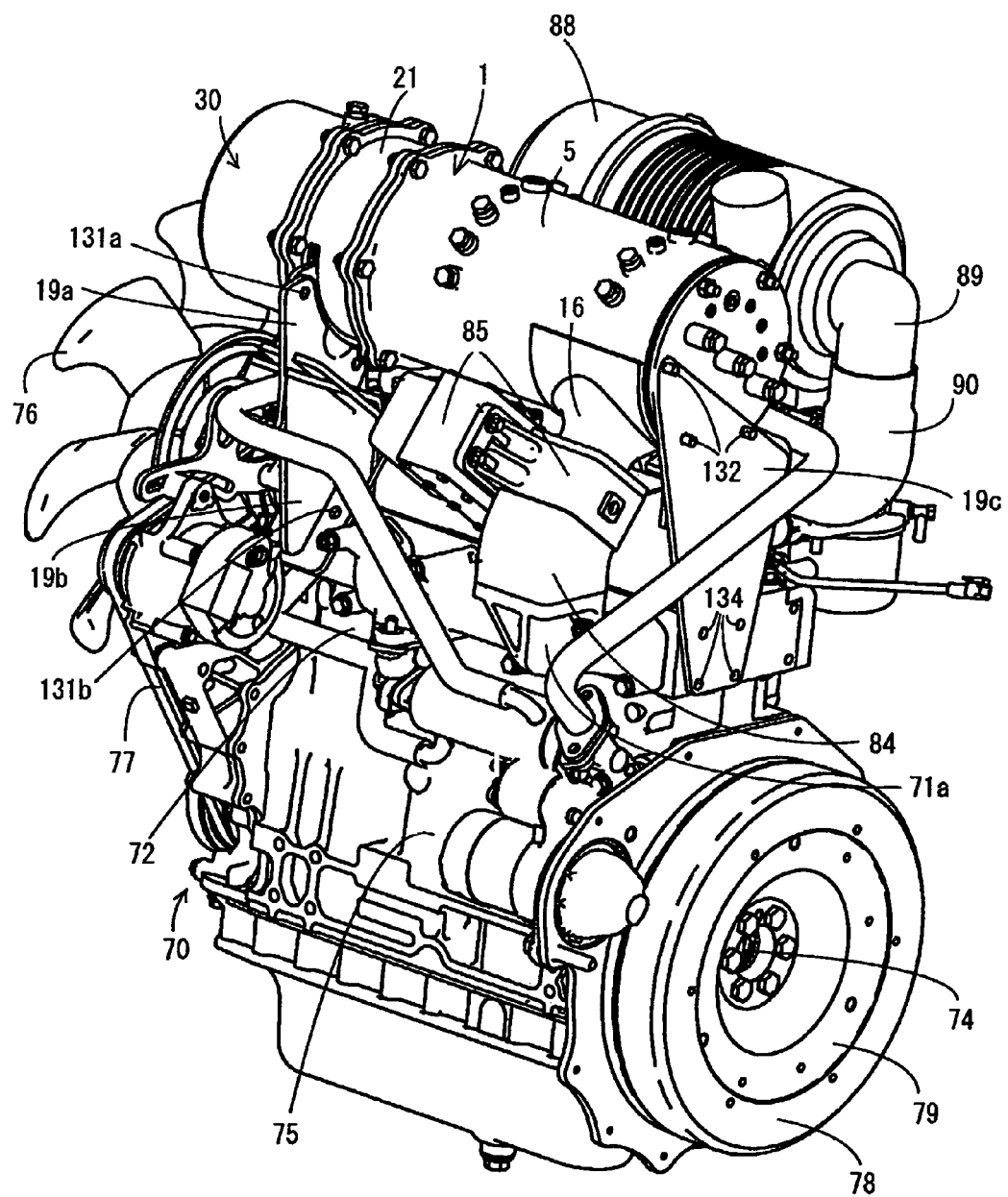
FIG. 15 is a perspective view, when viewed from a left rear side, of the diesel engine.

As shown in FIG. 10, FIG. 11, and FIG. 15, one end side of a first support leg body 19a is fixed by welding to the outer surface of the filter outer case 21. The other end side of the first support leg body 19a is detachably fastened to the upper end side of a second support leg body 19b by a bolt 131a. The second support leg body 19b is detachably fastened to a portion closer to the cooling fan 76 in the cylinder head 72 by a bolt 131b. One end side (upper end side) of a third support leg body 19c is detachably fastened to a side surface on the exhaust gas inflow port 12 side in the catalyst outer case 5 by a bolt 132. The other end side (lower end side) of the third support leg body 19c is detachably fastened to a side surface on the flange wheel housing 78 side in the cylinder head 72 by a bolt 134. The first support leg body 19a and the second support leg body 19b correspond to a front filter bracket (filter support body) for supporting the DPF 1, and the third support leg body 19c corresponds to a rear filter bracket (filter support body) for supporting the DPF 1.

Figure 14:
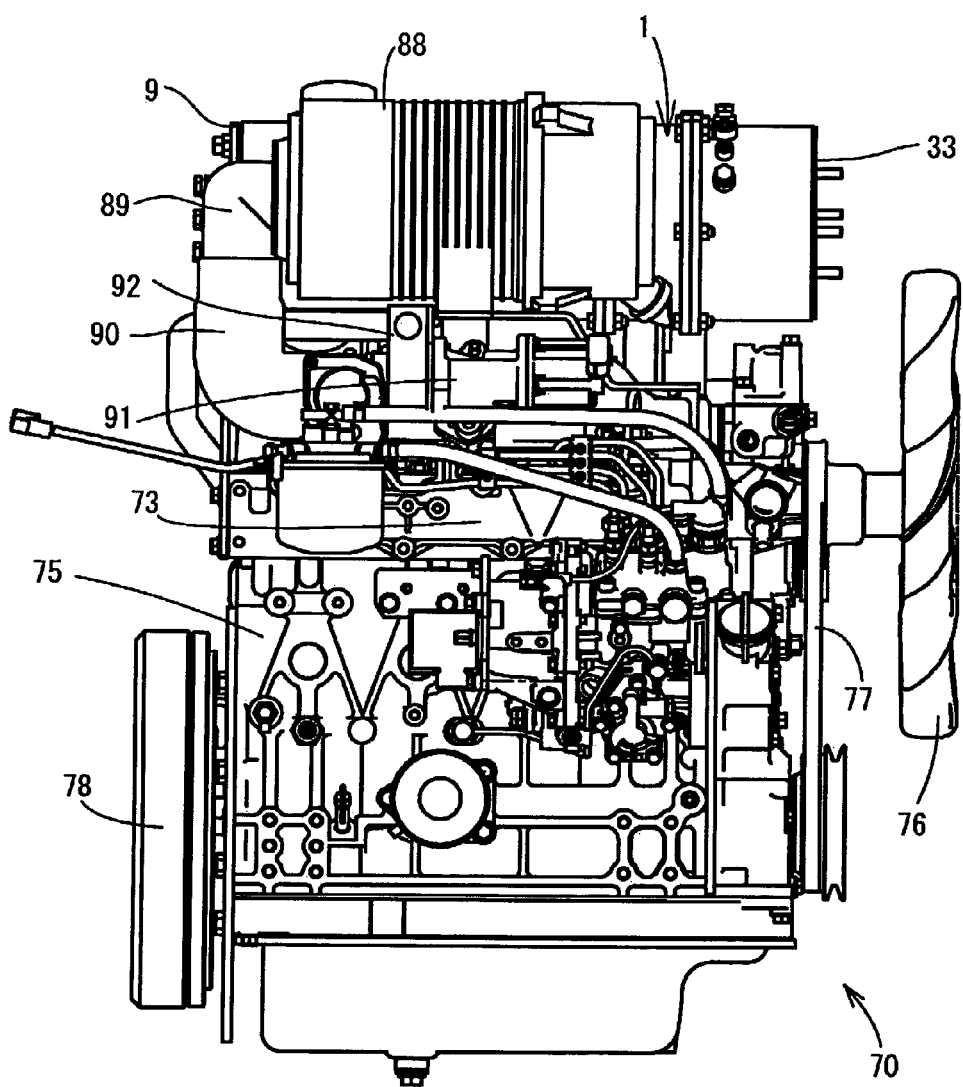
FIG. 14 is a right side view of the diesel engine.

As shown in FIG. 13 to FIG. 15, an exhaust manifold outlet pipe 71a of the exhaust manifold 71 is opened upward. There are provided an exhaust connection pipe 84 for making the DPF 1 communicate with the exhaust manifold 71 and an exhaust throttle device 85 for regulating an exhaust pressure of the diesel engine 70. The lower end side of the exhaust connection pipe 84 is coupled to the exhaust manifold outlet pipe 71a. The upper end side of the exhaust connection pipe 84 is extended upward, and the exhaust gas inlet pipe 16 is coupled to the upper end side of the exhaust connection pipe 84. Further, the upper end side of the exhaust connection pipe 84 is bent and extended toward the center in the left and right width of the diesel engine 70. The exhaust throttle device 85 is fitted in a portion in which the upper end side of the exhaust connection pipe is connected to the exhaust gas inlet pipe 16 of the DPF 1.

According to the above-mentioned construction, when the soot collected by the exhaust gas cleaning operation of the DPF 1 is deposited on the soot filter 3, the exhaust throttle device 85 is regulated to increase the exhaust pressure of the diesel engine 70 to increase the temperature of the exhaust gas from the diesel engine 70, whereby the soot deposited on the soot filter 3 is burned and the soot filter 3 is regenerated. Thus, even if an operation in which the temperature of the exhaust gas is easily decreased because of low load (operation in which the soot is easily deposited) is performed continuously, the exhaust gas cleaning capability of the DPF 1 can be kept properly by regenerating the soot filter 3. In this regard, a burner for burning the soot deposited on the soot filter 3 is not required.

As shown in FIG. 11 to FIG. 15, there is provided an air cleaner 88 for supplying air to the diesel engine 70. The air cleaner 88 is arranged above the intake manifold 73 on one side of the upper surface of the diesel engine 70. An air intake pipe 91 of the intake manifold 73 is coupled to an intake outlet pipe 89 of the air cleaner 88 via an intake connection pipe 90. The air cleaner 88 is fitted to the cylinder head 72 via a cleaner support leg 92. That is, air cleaned by the air cleaner 88 is supplied to the intake manifold 73 via the intake outlet pipe 89, intake connection pipe 90, and the air intake pipe 91.

As shown in FIG. 10 to FIG. 15, the DPF 1 and the air cleaner 88 are formed in the shape of a long cylinder along the engine output shaft 74 and are arranged on the upper surface side of the diesel engine 70. The cylinder head 72 has its intake manifold 73 side exposed outward and hence is in a state where a maintenance work can be easily performed. Further, the exhaust gas inlet pipe 16 and the exhaust gas outlet pipe 34 (exhaust gas outflow port) are arranged separately from each other on the left and right sides of the DPF 1, that is, on one end side in the longitudinal direction and the other end side in the longitudinal direction in the DPF 1.

As is clear from the above-mentioned construction, the DPF 1 is coupled to the exhaust manifold 71 of the engine 70 and is coupled to the cylinder head 72 via the plurality of filter support bodies (support leg bodies 19a to 19c). This construction makes it possible to arrange the DPF 1 as one of the constituent parts of the diesel engine 70 in a highly rigid state in the diesel engine 70 and hence to eliminate the need to take countermeasures against the exhaust gas for each unit of a working vehicle or the like, which can enhance the general purpose use of the diesel engine 70. That is, the DPF 1 and the air cleaner 88 can be supported in a highly rigid state by the use of the cylinder head 72 that is a highly rigid part of the diesel engine 70, so that the DPF 1 and the air cleaner 88 can be prevented from being damaged by vibration or the like. Moreover, the DPF 1 and the air cleaner 88 can be mounted on the diesel engine 70 for shipping at a place where the diesel engine 70 is manufactured. That is, the diesel engine 70, the DPF 1, and the air cleaner 88 can be constructed together in a compact size.

Further, one end side in the longitudinal direction of the DPF 1 is coupled to the cylinder head 72 via the first and second support leg bodies 19a, 19b, and the other end side in the longitudinal direction of the DPF 1 is coupled to the cylinder head 72 via the third support leg body 19c. A middle portion in the longitudinal direction of the DPF 1 is coupled to the exhaust manifold 71. Hence, the DPF 1 can be coupled to the top of the diesel engine 70 in a highly rigid state by three-point support using the exhaust manifold 71 and the support leg bodies 19a to 19c.

Figure 16:
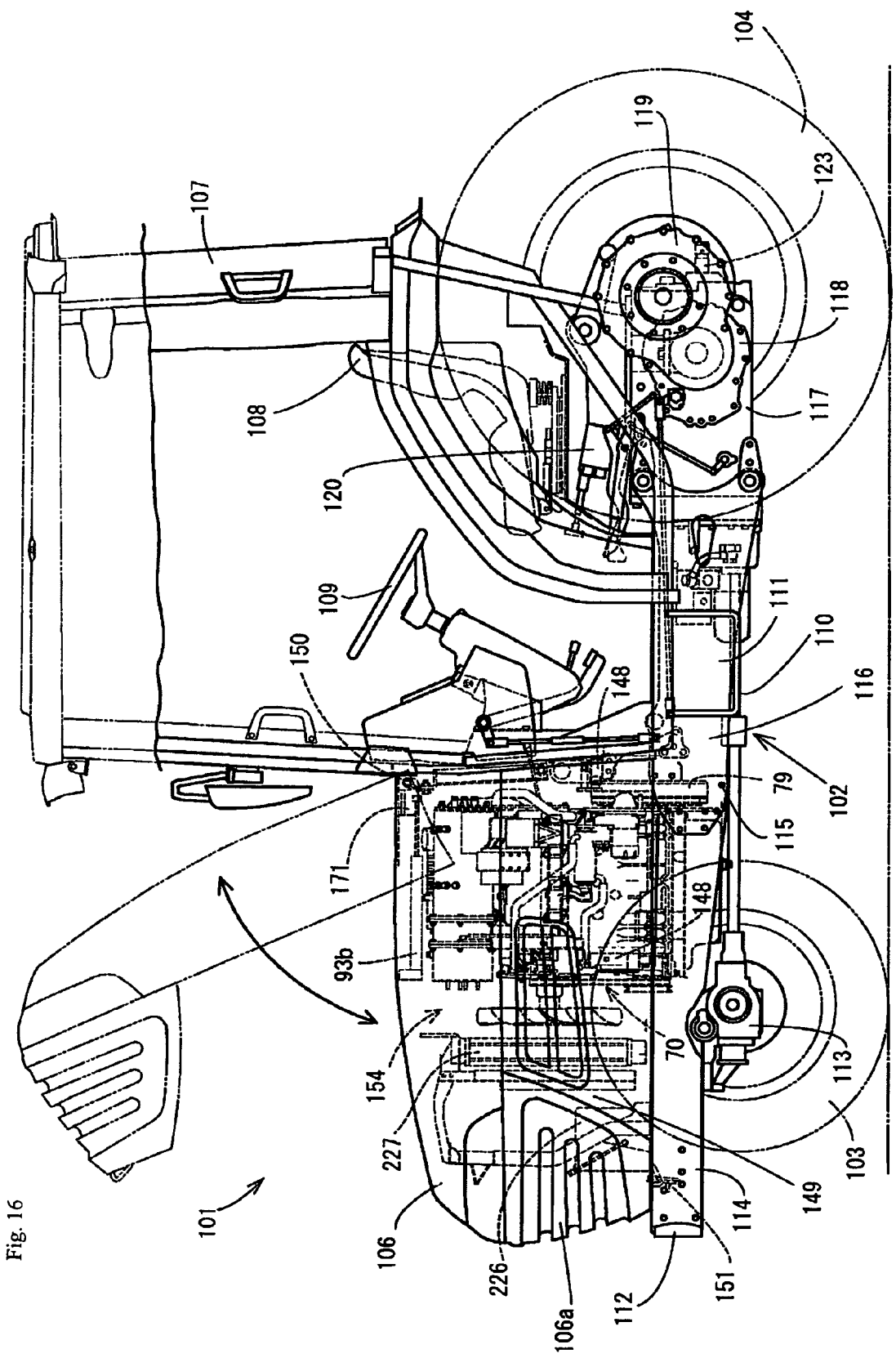
FIG. 16 is a side view of a tractor.
Figure 17:
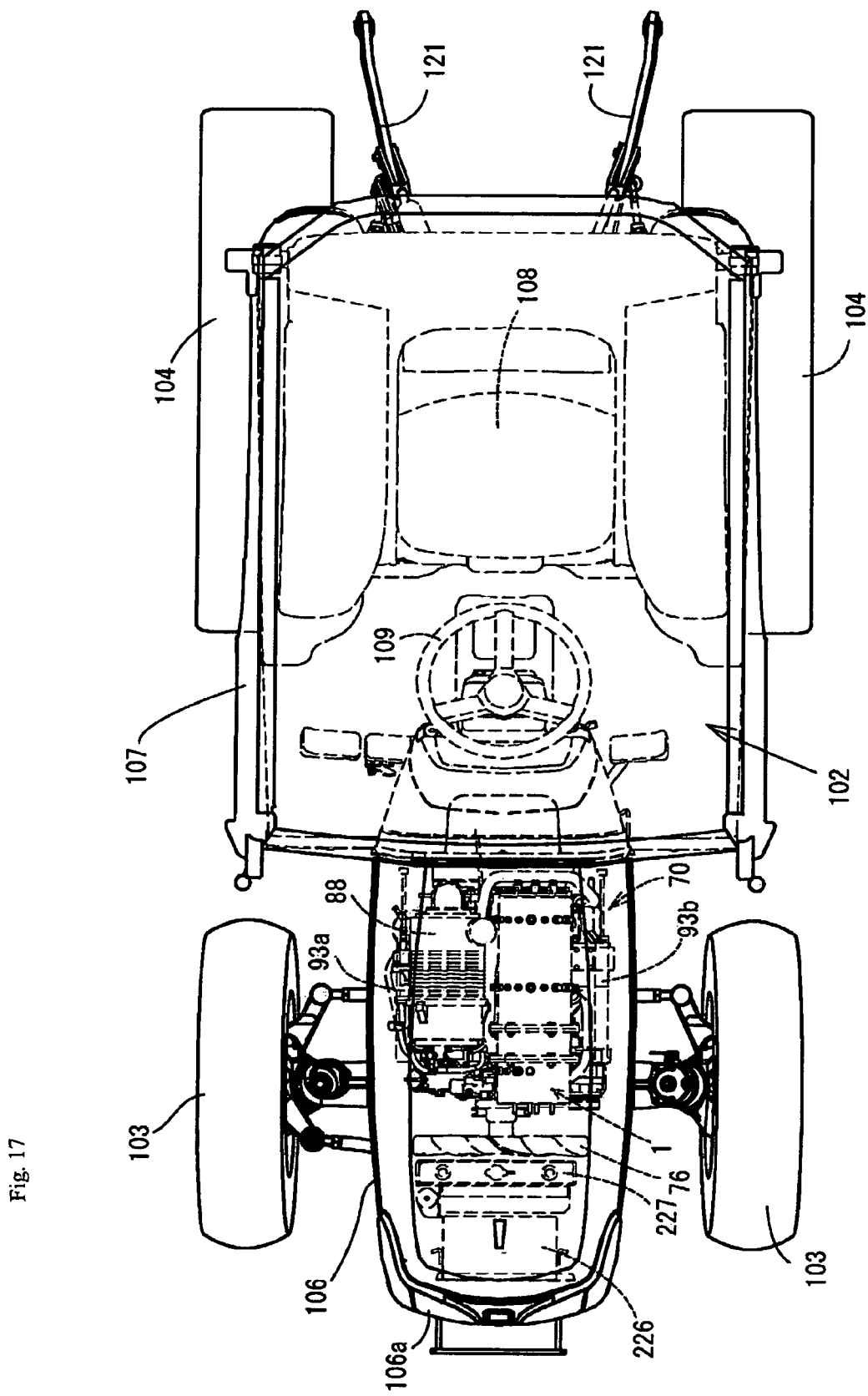
FIG. 17 is a plan view of the tractor.
Figure 18:
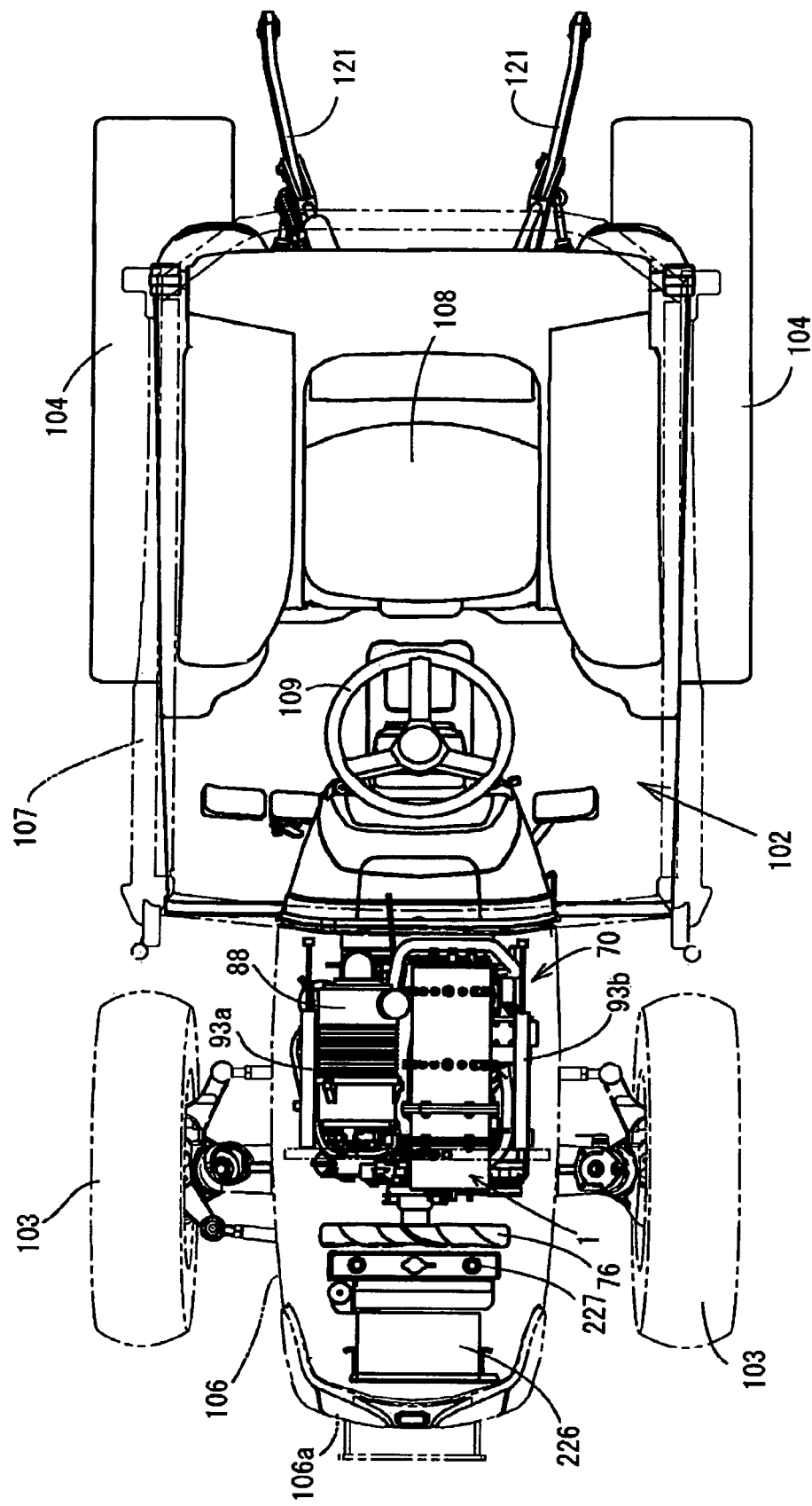
FIG. 18 is a plan view of the tractor.

A structure in which the diesel engine 70 is mounted in a tractor 101 as a travel vehicle will be described with reference to FIG. 16 to FIG. 19. As shown in FIG. 16, the tractor 101 as a travel vehicle provided with a cabin is constructed in the following manner: that is, a travel machine body 102 is supported by a pair of left and right front wheels 103 and by a pair of left and right rear wheels 104, and the rear wheels 104 and the front wheels 103 are driven by the engine 70 mounted in the front portion of the travel machine body 102 to make the tractor 101 travel back and forth. In this case, a pair of left and right travel parts are constructed of a set of front and rear wheels 103, 104 positioned on the left side in the traveling direction of the travel machine body 102 and of a set of front and rear wheels 103, 104 positioned on the right side in the traveling direction of the travel machine body 102.

The engine 70 is covered with a hood 106. A cabin 107 is set on the upper surface of the travel machine body 102, and a steering seat 108 on which an operator is seated and a steering handle 109 (round handle) as a steering means positioned forward of the steering seat 108 are fitted in the cabin 107. When the operator seated on the steering seat 108 turns the steering handle 109, the steering angle of the left and right front wheels 103 are varied according to the amount of operation (the amount of turning). A pair of left and right steps 110 from which the operator gets on and off are provided on the left and right outside portions of the cabin 107. A fuel tank 111 for storing fuel supplied to the engine 70 is provided inside the steps 110 and below the bottom portion of the cabin 107.

Further, the travel machine body 102 is constructed of an engine frame 114 having a front bumper 112 and a front axle case 113 and of a left and right machine body frames 116 detachably fixed to the rear portion of the engine frame 114 by bolts 115. A transmission case 117 for transmitting an output from the engine 70 to the rear wheels 104 (front wheels 103) at an appropriate speed change is coupled to the rear portion of the machine body frame 116. In this case, the rear wheels 104 are fitted to the transmission case 117 via a rear axle case 118 fitted to the transmission case 117 in such a way as to protrude outward from the outside surface of the transmission case 117 and via a final gear case 119 fitted to the outside end of the rear axle case 118.

The transmission case 117 has a hydraulically operated lift mechanism 120 detachably fitted on the upper surface in the rear portion thereof, the lift machine 120 being for a working machine such as a cultivator (not shown in the drawing) and operated to lift and lower the working machine. The working machine such as the cultivator is coupled to the rear portion of the transmission case 117 in such a way as to move up and down via a lower link 121 and a top link (both of which are not shown in the drawing). Further, a PTO shaft 123 for driving the working machine is provided on the rear side surface of the transmission case 117.

The engine output shaft 74 is protruded backward in the rear side surface of the engine 70, and the flywheel 79 is directly coupled to the engine output shaft 74. Although not shown in detail in the drawing, a main drive shaft protruding backward from the flywheel 79 is coupled to a main speed-change input shaft protruding forward from the front surface the transmission case 117 by a power transmission shaft that has a flexible coupling fitted to both ends thereof and can expand and contract. The rotational power of the engine 70 is transmitted to the main speed-change input shaft, and the speed is varied as appropriate by a hydraulic continuously variable transmission and a traveling subordinate speed-change gear mechanism, and then this driving force is transmitted to the rear wheels 104 via a differential gear mechanism. Further, the rotation of the engine 70 that is varied as appropriate by the traveling subordinate speed-change gear mechanism is transmitted to the front wheels 103 via the front wheel drive case and via the differential gear mechanism of the axle case 113.

Next, a structure for fitting the engine 70 and the hood 106 will be described. The engine 70 is coupled to the engine frame 114 via a vibration isolation rubber 148. The engine 70 is supported by the travel machine body 102 by means of the vibration isolation rubber. A front grill 106a is integrally coupled to the lower side of the front portion of the hood 106. The left and right sides, the front side, and the upper side of the engine 70 are covered with left and right engine covers 149 supported by the engine frame 114 and the hood 106. There is provided a hood locking mechanism 151 for locking the lower end side of the front grill 106a in such a way that the lower end side of the front grill 106a can be unlocked. The hood locking mechanism 151 is arranged in the engine frame 114 below the front grill 106a. The hood 106 is supported in a position to cover the front side and the upper side of the engine 70 by the hood locking mechanism 151. In this regard, the parts fitted to the engine such as a battery 226 and a radiator 227 arranged forward of the engine 70 are covered with the hood 106 and the front grill 106a. Further, as shown in FIG. 16, a hood opening/closing pivot shaft 150 is arranged inside the rear portion of the hood 106. By unlocking the hood locking mechanism 151 and lifting the front portion of the hood 106, the front portion of the hood 106 is moved upward around the hood opening/closing pivot shaft 150 of the rear portion of the hood 106 to open the front side and the upper side of the engine 70.

Figure 19:
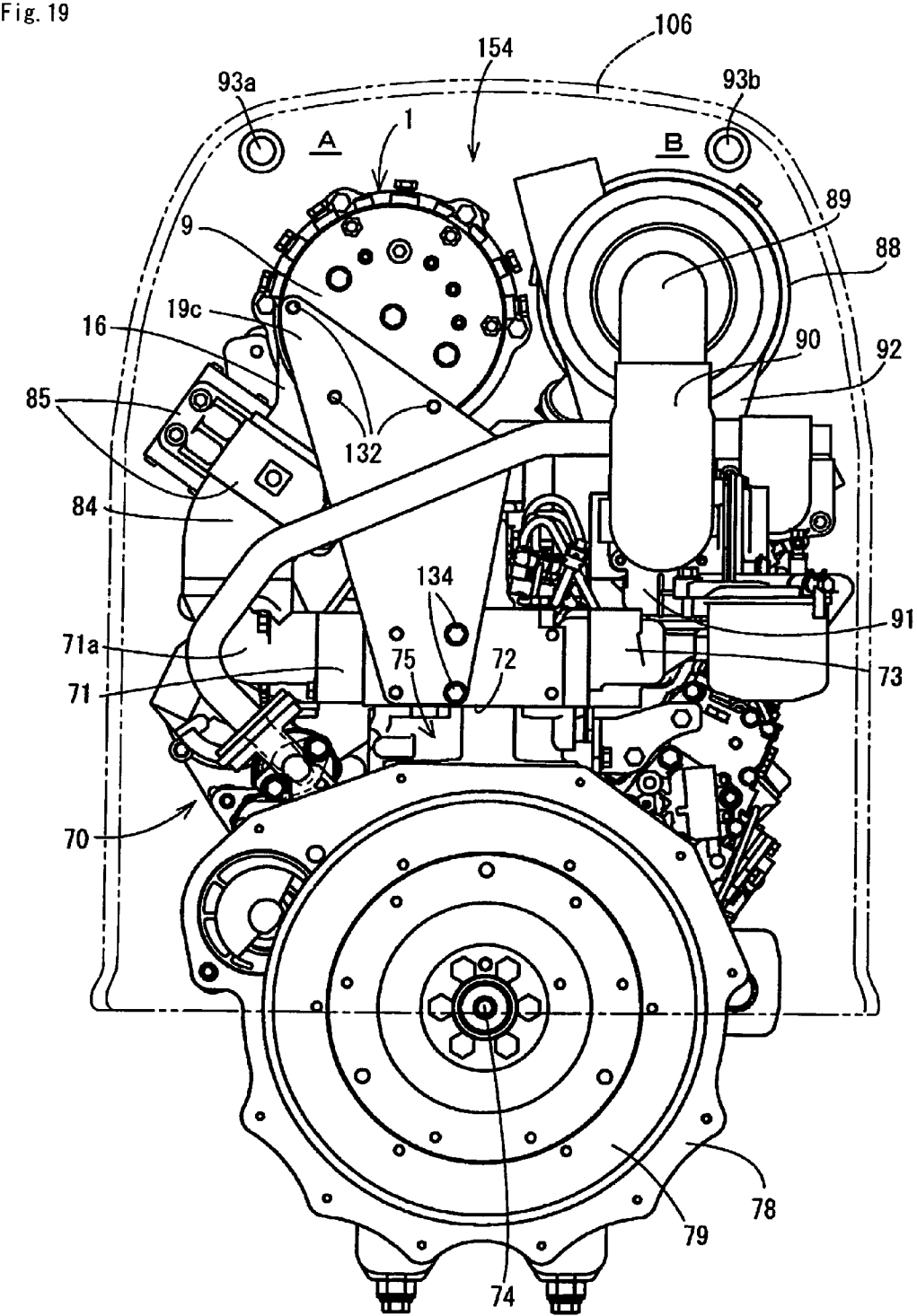
FIG. 19 is a front view to show the arrangement of the diesel engine in a hood.

As shown in FIG. 16, gas springs 93a, 93b are coupled to a hood side hinge 171, which is fixed to the lower surface side of the hood 106, and to the hood opening/closing pivot shaft 150 set on the travel machine body side. The hood 106 is coupled to the travel machine body side by the gas springs 93a, 93b in such a way as to turn. By the strutting action of the gas springs 93a, 93b, the hood 106 is supported in a turned position and hence the upper side and the front side of the engine room 154 are opened. As shown in FIG. 19, the right gas spring 93a is extended in the front and rear direction by the use of a clearance A between the DPF 1 and the hood 106, and the left gas spring 93b is extended in the front and rear direction by the use of a clearance B between the air cleaner 88 and the hood 106.

According to the above-mentioned construction, by locking the lower end side of the front grill 106a on the engine frame 114 via the hood locking mechanism 151 and by supporting the hood 106 at a closed position shown by a solid line in FIG. 16, the upper side and the front side of the engine 70 can be covered with the hood 106. When the operator unlocks the hood locking mechanism 151 and lifts the front portion of the hood 106, the operator can turn the hood 106 around the hood opening/closing pivot shaft 150 and can perform a maintenance work of the engine 70 and the like.

As described above, the present embodiment is the travel vehicle-mounted engine device mounted on the travel machine body 102 and covered with the hood 106, which includes the air cleaner 88 for supplying air to the engine 70 and the DPF 1 for cleaning the exhaust gas from the engine 70, wherein the air cleaner 88 is arranged above the intake manifold 73 on one side of the upper surface of the engine 70, and the DPF 1 is arranged above the exhaust manifold 71 on the other side of the upper surface of the engine 70. Thus, the air cleaner 88 and the DPF 1 can be compactly set between the upper surface of the engine 70 and the lower surface of the hood 106 by the effective use of a space on the upper surface side of the engine 70. For example, when the shaft center line of the DPF 1 having an outer shape formed in a circular cylinder, the shaft center line of the air cleanser 88 having an outer shape formed in a circular cylinder, and the shaft center line of a crank-shaped output shaft 74 of the engine are arranged in parallel to each other when viewed from above, the DPF 1 and the air cleaner 88 can be arranged within a square outer shape of the engine 70 when viewed from above. That is, the outer shape (square outer shape) of the upper surface of the engine 70 and the outer shape (square outer shape) of the upper surface of the DPF 1 and the air cleaner 88 can be formed nearly in the same size, so that an engine room of a size required to have the engine 70 fitted therein can be easily ensured. The DPF 1 and the air cleaner 88 can be fitted close to each other at high positions in the hood 106 without forming the hood 106 in a large size.

Further, in the present embodiment, the DPF 1 is arranged at an offset position closer to the center in the left and right width of the engine 70 than the air cleaner 88, so that the DPF 1 having larger mass than the air cleaner 88 can be supported at a position closer to the center in the left and right width of the engine 70. This can reduce mechanical vibrations and noises caused by the engine 70, and hence can simplify the structure of the vibration isolation rubber of the engine legs of the engine 70.

Still further, the present embodiment is constructed in such a way that the clearance between the inner surface of the hood 106 and the DPF 1 is made larger than the clearance between the air cleaner 88 and the DPF 1, so that the air cleaner 88 can be easily heated by the heat of the DPF 1 arranged close to the air cleaner 88. Moreover, by the thermal insulation effect of the space between the DPF 1 and the inner surface of the hood 106, the temperature of the DPF 1 can be easily held at a temperature required for cleaning the exhaust gas and the hood 106 can be prevented from being overheated by the exhaust heat at a comparatively high temperature of the DPF 1.

Still further, the present embodiment is constructed in such a way that the clearance between the inner surface of the hood 106 and the DPF 1 is made larger than the clearance between the inner surface of the hood 106 and the air cleaner 88, so that the DPF 1 having larger mass than the air cleaner 88 can be supported closer to the center of the engine 70 to reduce mechanical vibrations and noises caused by the engine 70. Hence, the structure of the vibration isolation rubber of the engine legs of the engine 70 can be made simple.

Still further, the present embodiment is the travel vehicle-mounted engine device which includes the exhaust connection pipe 84 for making the DPF 1 communicate with the exhaust manifold 71 and the exhaust throttle device 85 for regulating the exhaust pressure of the engine 70, wherein the exhaust connection pipe 84 is extended upward and the exhaust gas inflow port 12 (exhaust gas inlet pipe 16) of the DPF 1 is coupled to the upper end side of the exhaust connection pipe 84, the upper end side of the exhaust connection pipe 84 is bent and extended closer to the center in the left and right width of the engine 70, and the exhaust throttle device 85 is set at a connection portion in which the upper end side of the exhaust connection pipe 84 is connected to the exhaust gas inflow port 12 (exhaust gas inlet pipe 16) of the DPF 1. Hence, the DPF 1 having larger mass than the air cleaner 88 can be easily supported closer to the center of the engine 70 without being restricted by the structure of the exhaust manifold 71. Hence, this can reduce mechanical vibrations and noises caused by the engine 70 and can simplify the structure of the vibration isolation rubber of the engine legs of the engine 70. Moreover, the exhaust throttle device 85 is fitted on the upper end side of the exhaust connection pipe 84 bent closer to the center in the left and right width of the engine 70, so that the exhaust throttle device 85 can be compactly supported within an installation space of the engine 70 (external dimension of the engine=the left and right width dimension of the engine). The exhaust throttle device 85 is not protruded outward from the one side surface of the engine 70. That is, the exhaust throttle device 85 can be arranged inside the side surface of the engine 70 having the exhaust throttle device 85 arranged therein. Hence, this can prevent the exhaust throttle device 85 from colliding with an obstacle and being damaged in the operation of fitting or maintaining the engine 70.

Still further, the present embodiment is the travel vehicle-mounted engine device which includes the front filter brackets 19a, 19b for supporting one end side of the DPF 1 by the front portion of the cylinder head 72 of the engine 70 and the rear filter bracket 19c for supporting the other end side of the DPF 1 by the rear portion of the cylinder head 72 of the engine 70, wherein the DPF 1 is supported within the front and rear width of the cylinder head 72. Hence, the DPF 1 having larger mass than the air cleaner 88 can be easily supported within the front and rear width of the engine 70 without being restricted by the structure of the exhaust manifold 71. The engine room 154 of a size required to have the engine 70 fitted therein can be easily ensured without forming the hood 106 in a large size. The DPF 1 and the air cleaner 88 can be compactly fitted at high positions in the hood 106.

REFERENCE NUMERALS

1 DPF (diesel particulate filter) (gas cleaning filter)
2 diesel oxidation catalyst (gas cleaning filter)
3 soot filter (gas cleaning filter)
12 exhaust gas inflow port
70 engine
71 exhaust manifold
73 intake manifold
84 exhaust connection pipe
85 exhaust throttle device
88 air cleaner
101 tractor
106 hood

The invention claimed is:
1. A travel vehicle-mounted engine device mounted on a travel machine body and covered with a hood, comprising:
   an air cleaner for supplying air to an engine; and
   a gas cleaning filter for cleaning exhaust gas from the engine, the gas cleaning filter comprising an oxide catalyst and a soot filter;
   wherein the air cleaner is arranged above an intake manifold on one side of an upper surface of the engine;
   wherein the gas cleaning filter is arranged above an exhaust manifold on the other side of the upper surface of the engine so that a longitudinal direction thereof is in an axial direction of an output shaft of the engine and so as to be offset closer to center in a left and right width of the engine than the air cleaner;
   wherein a space between an inner surface of the hood and the gas cleaning filter is larger than a space between the air cleaner and the gas cleaning filter, while the space between the inner surface of the hood and the gas cleaning filter is larger than a space between the inner surface of the hood and the air cleaner;
   wherein the hood is turned at a hood opening/closing pivot provided inside a rear section of the hood so that front and top of the engine can open;
   wherein the hood contains a gas spring that uses stretching action to support the hood at a turned position; and
   wherein the gas spring is positioned in a space between an inner surface of the hood and the gas cleaning filter, so as to extend in a front and back direction.
2. The travel vehicle-mounted engine device as claimed in claim 1, further comprising:
   an exhaust connection pipe for making the gas cleaning filter communicate with the exhaust manifold; and
   an exhaust throttle device for regulating an exhaust pressure of the engine; and
   wherein the exhaust connection pipe is extended upward and an exhaust gas inlet of the gas cleaning filter is coupled to an upper end side of the exhaust connection pipe;
   wherein the upper end side of the exhaust connection pipe is bent and extended closer to a center in the left and right width of the engine; and
   wherein the exhaust throttle device is set in a connection portion in which the upper end side of the exhaust connection pipe is connected to the exhaust gas inlet of the gas cleaning filter.

3. The travel vehicle-mounted engine device as claimed in claim 1, further comprising:
- a front filter bracket for supporting one end side of the gas cleaning filter by a front portion of a cylinder head of the engine; and
- a rear filter bracket for supporting the other end side of the gas cleaning filter by a rear portion of the cylinder head of the engine,
- wherein the gas cleaning filter is supported within a front and rear width of the cylinder head.

* * * * *